Figure 1:
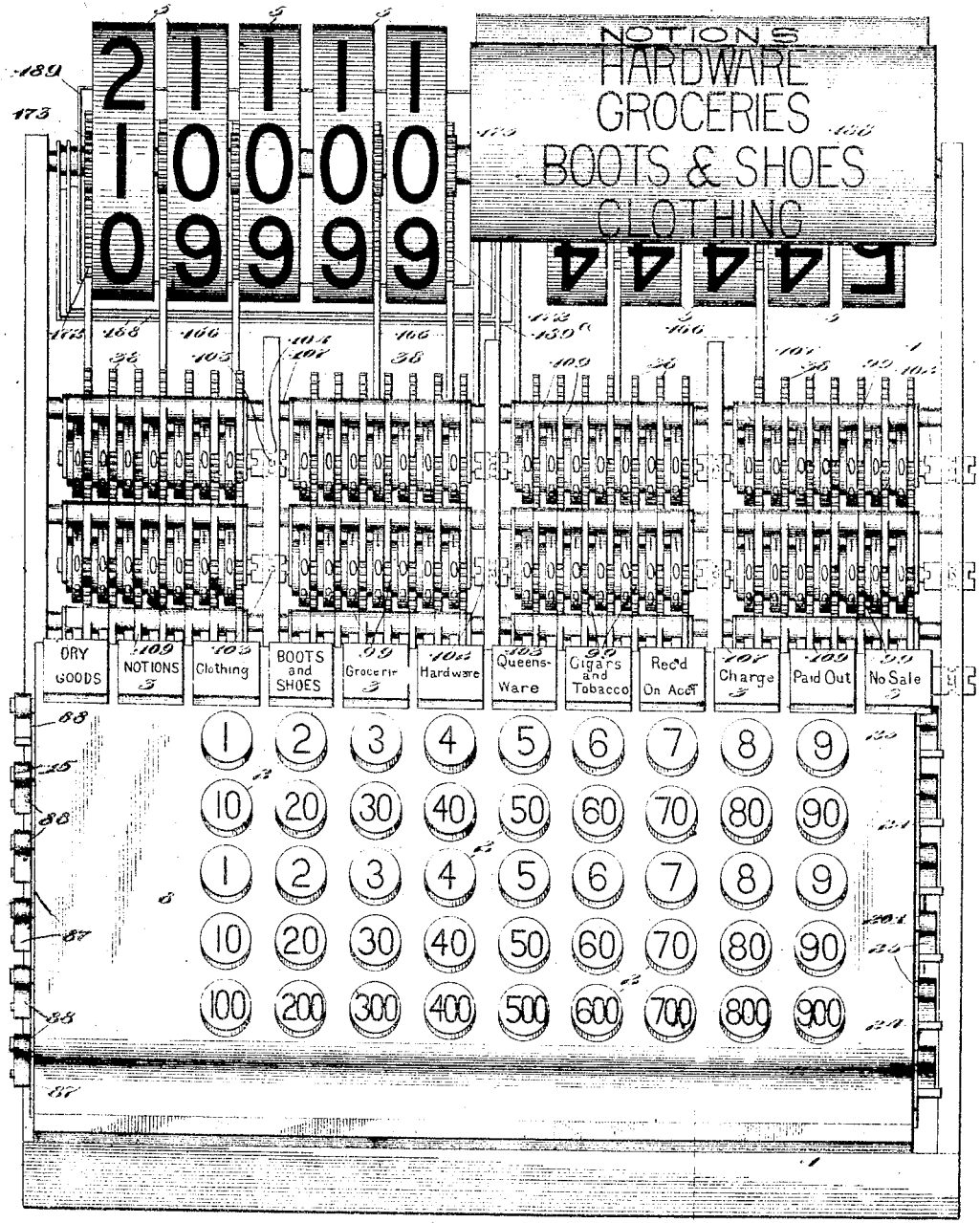

J. H. McCORMICK.
CASH REGISTER.
APPLICATION FILED JAN. 3, 1900.

1,103,068.

Patented July 14, 1914.
12 SHEETS—SHEET 1.

WITNESSES:

INVENTOR
John H. McCormick
Alvan Macauley
ATTORNEY

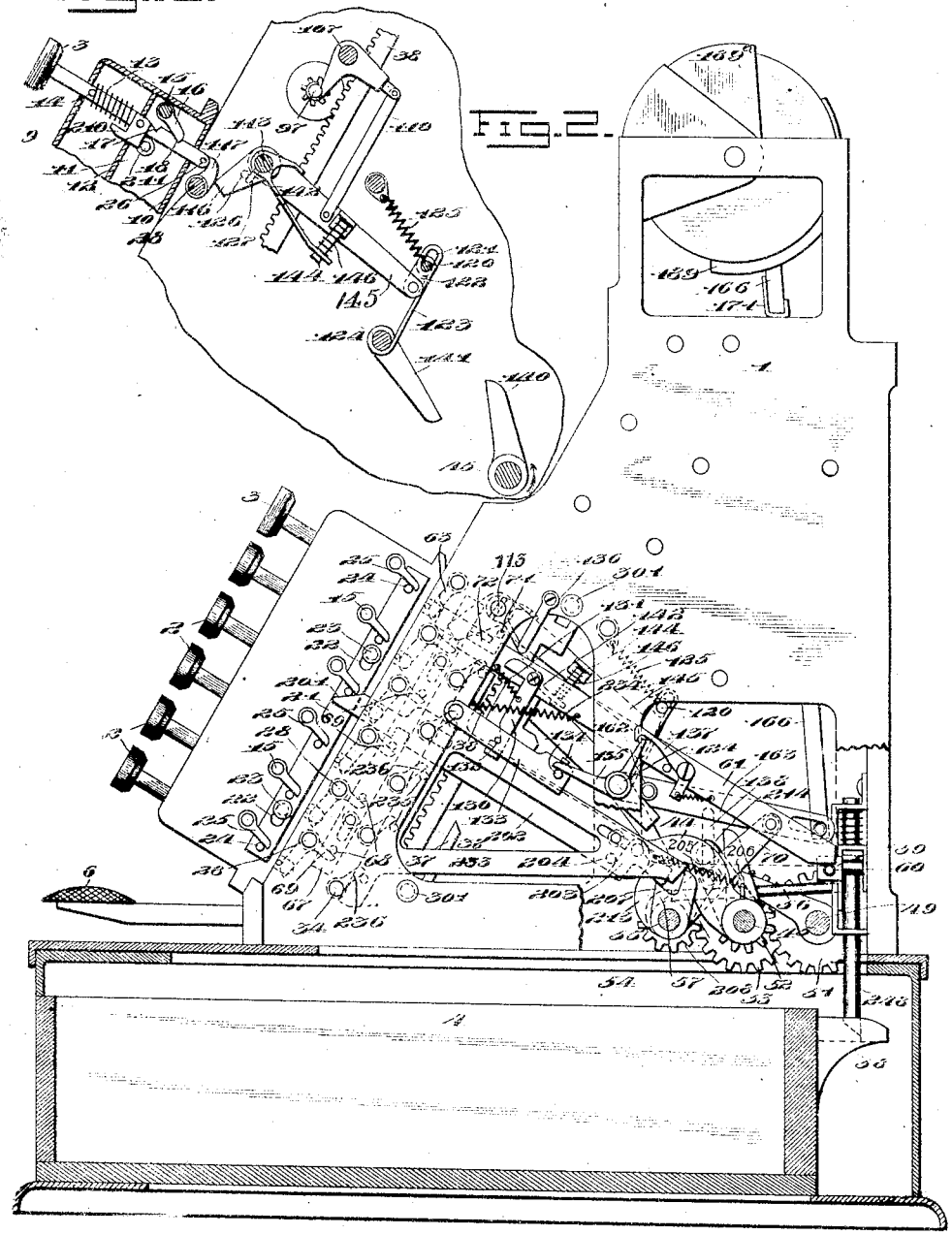

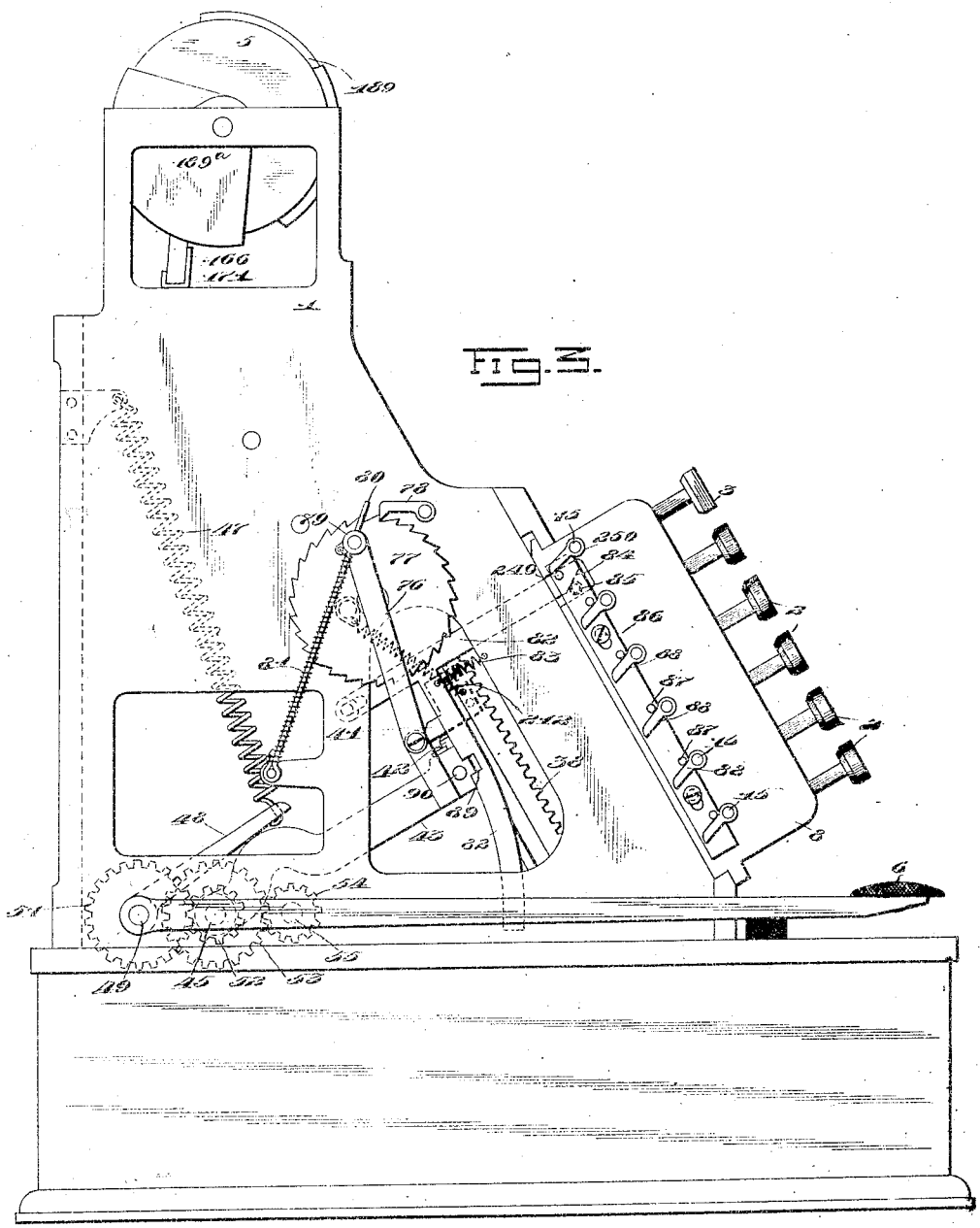

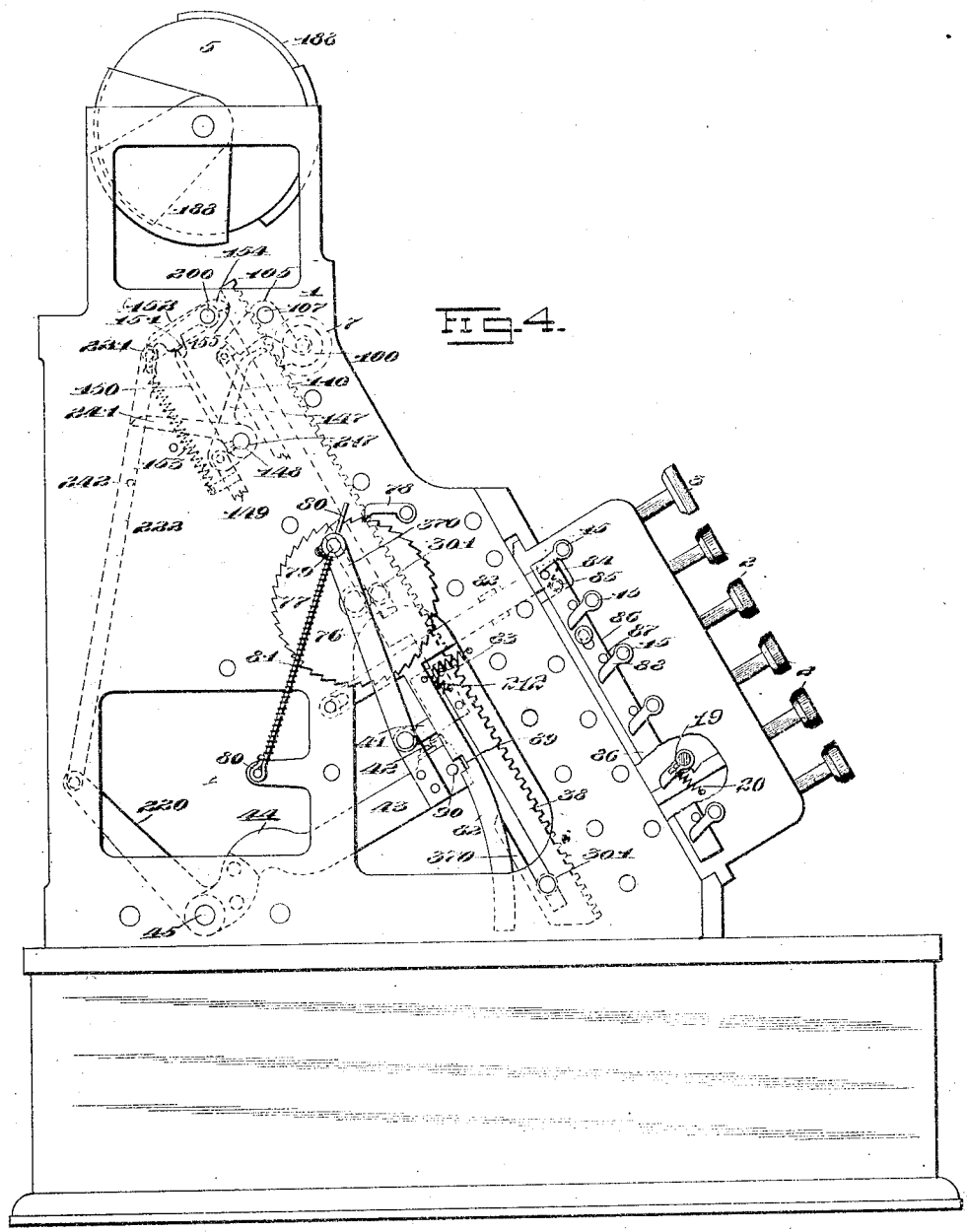

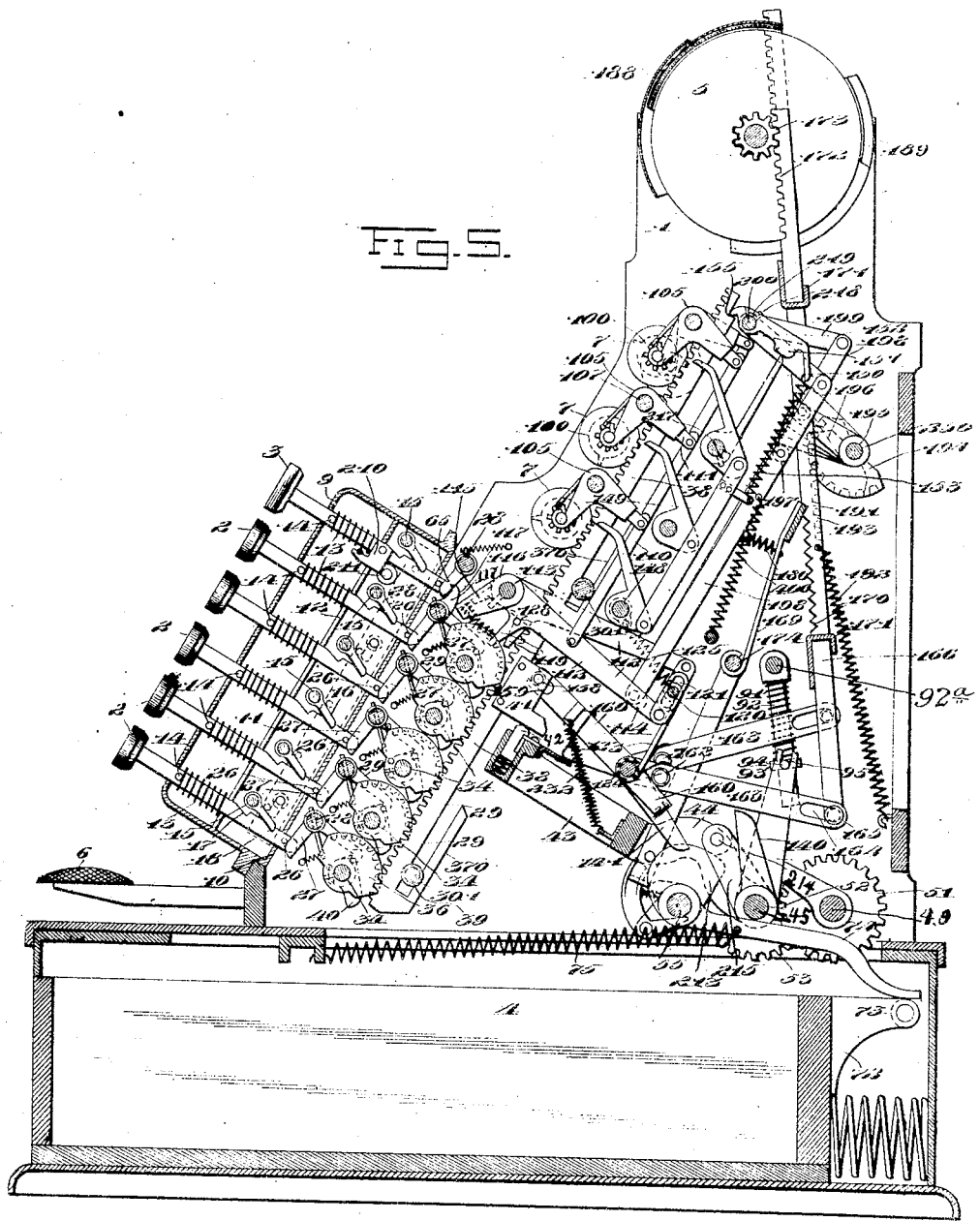

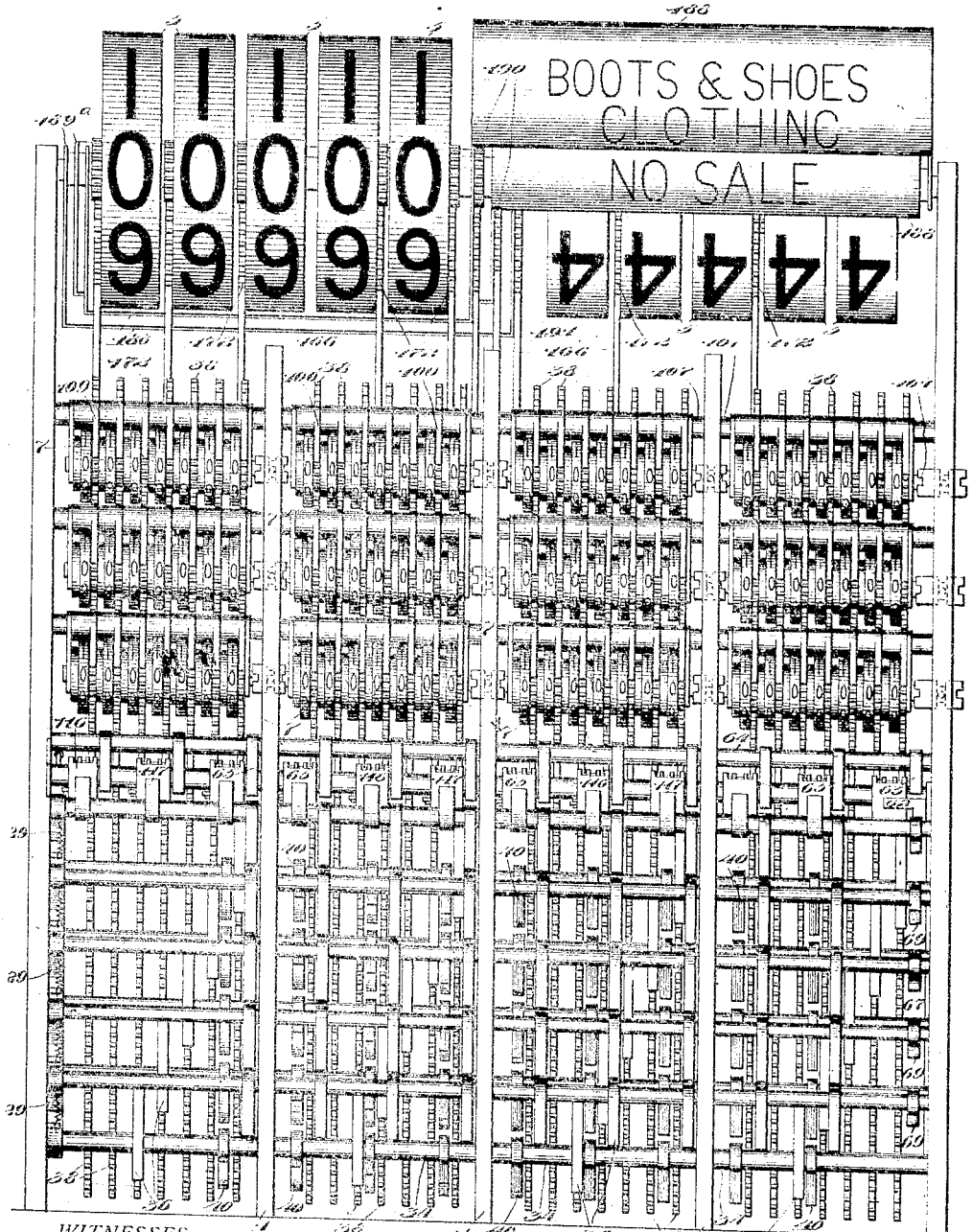

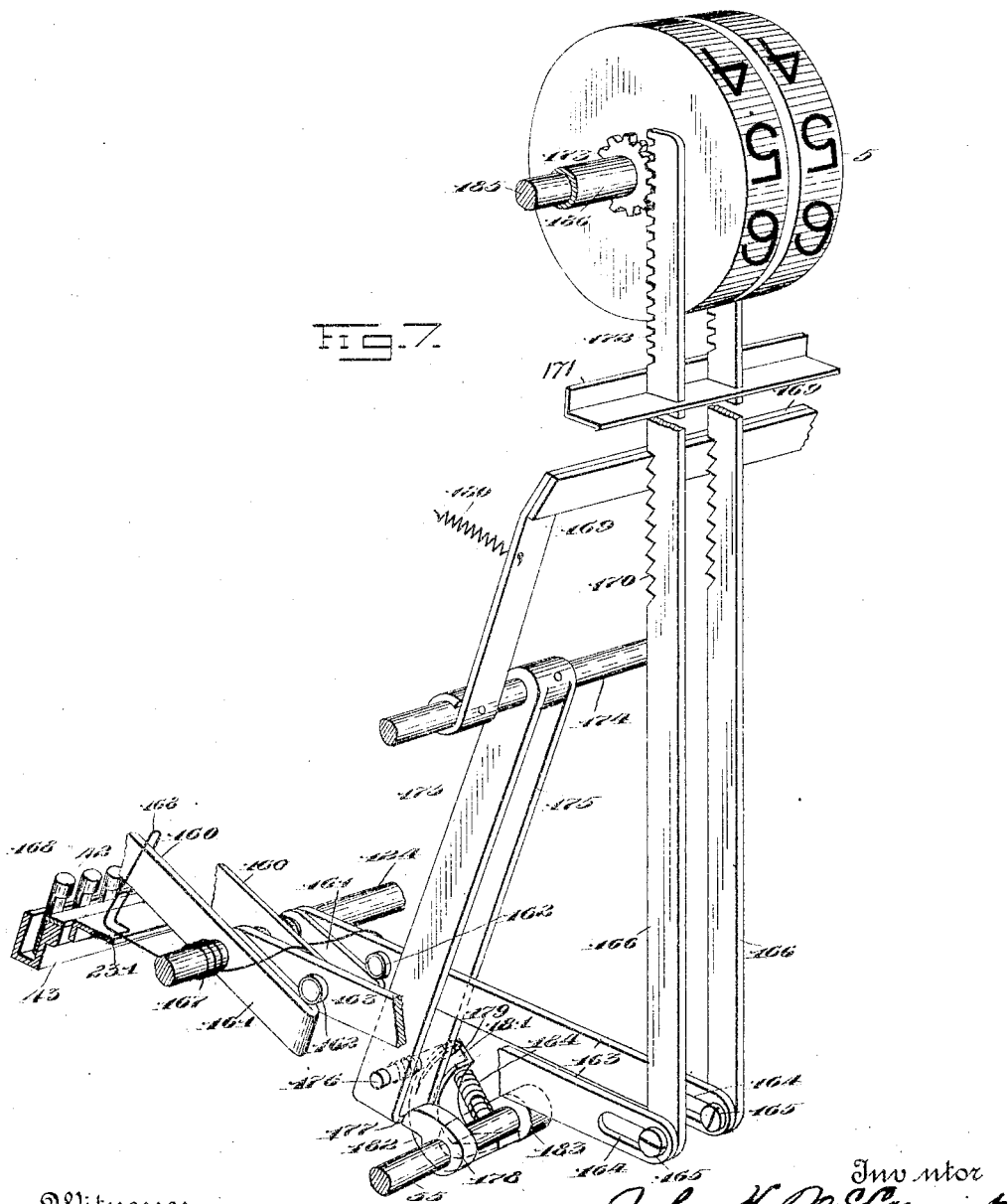

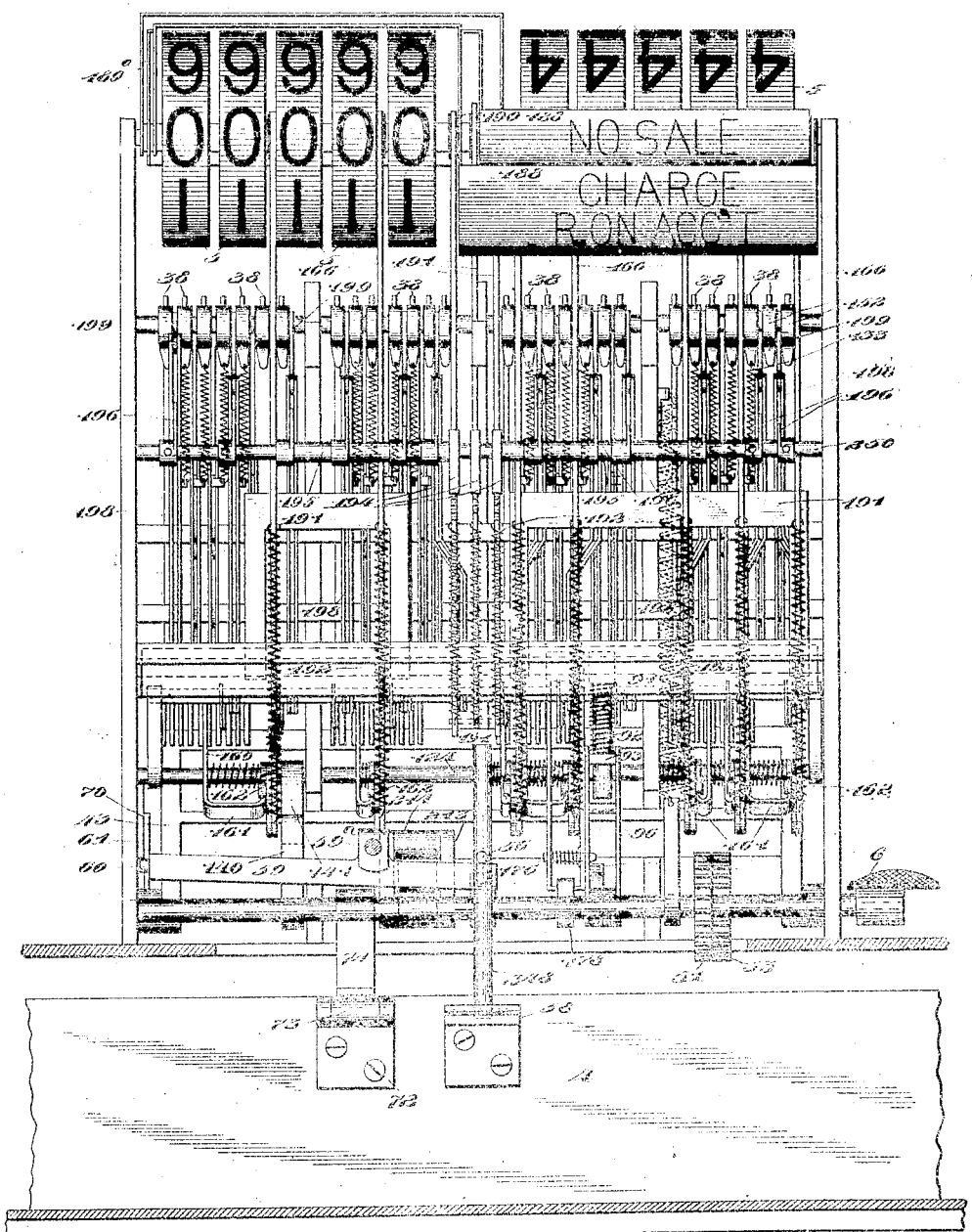

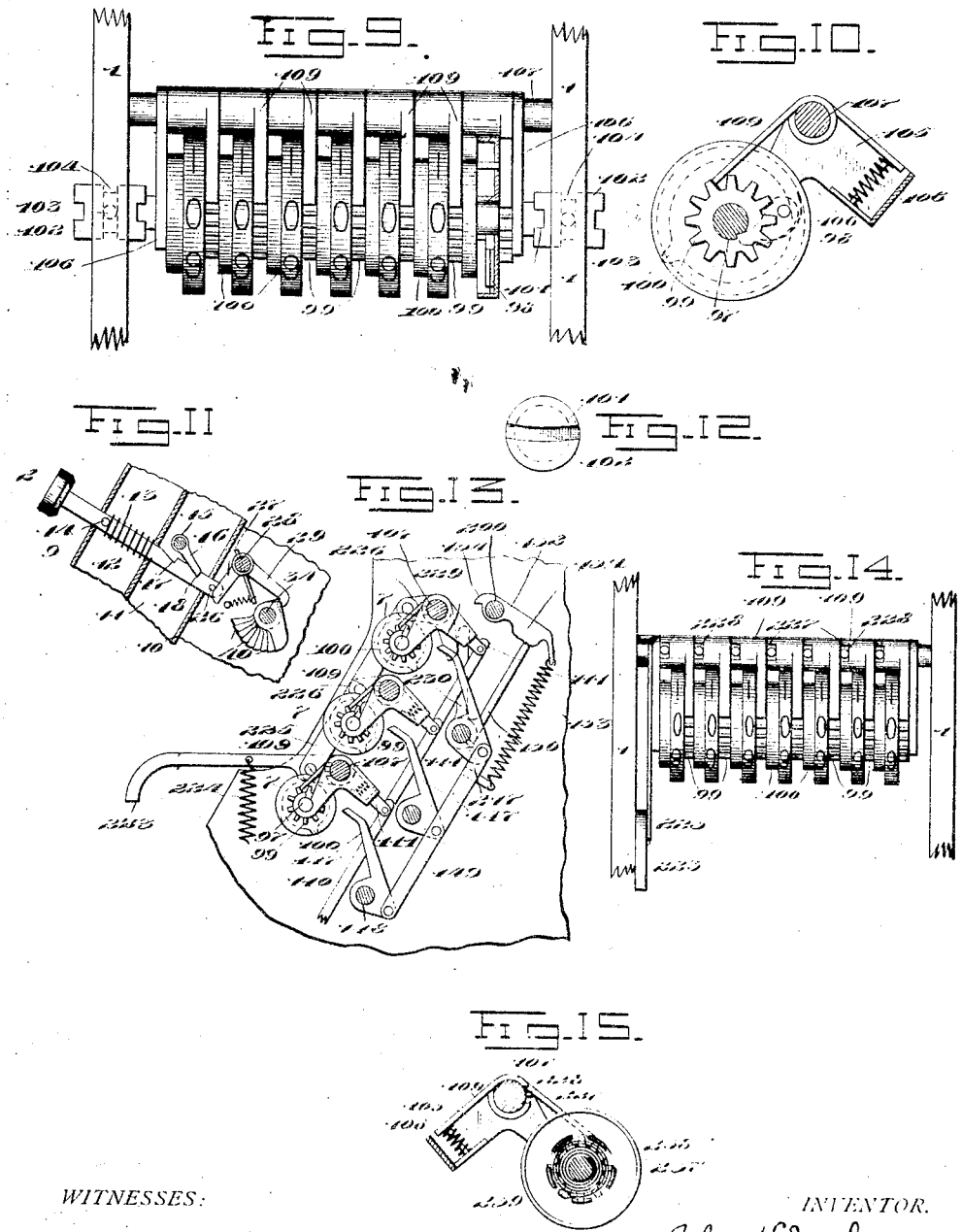

J. H. McCORMICK.
CASH REGISTER.
APPLICATION FILED JAN. 3, 1900.
1,103,068.
Patented July 14, 1914.
12 SHEETS—SHEET 10.
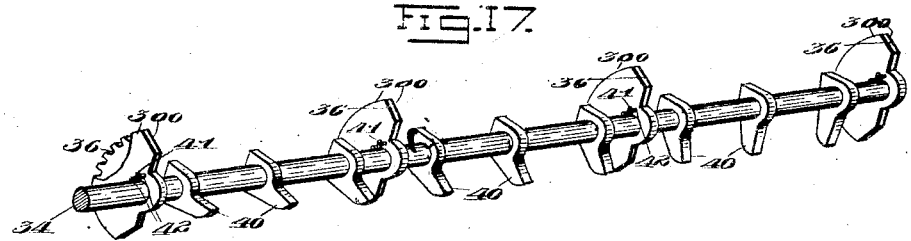
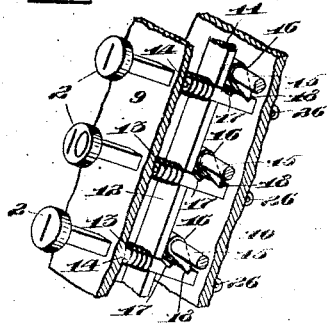
WITNESSES:
INVENTOR.
John H. McCormick
BY
Alvan Macauley
ATTORNEY.

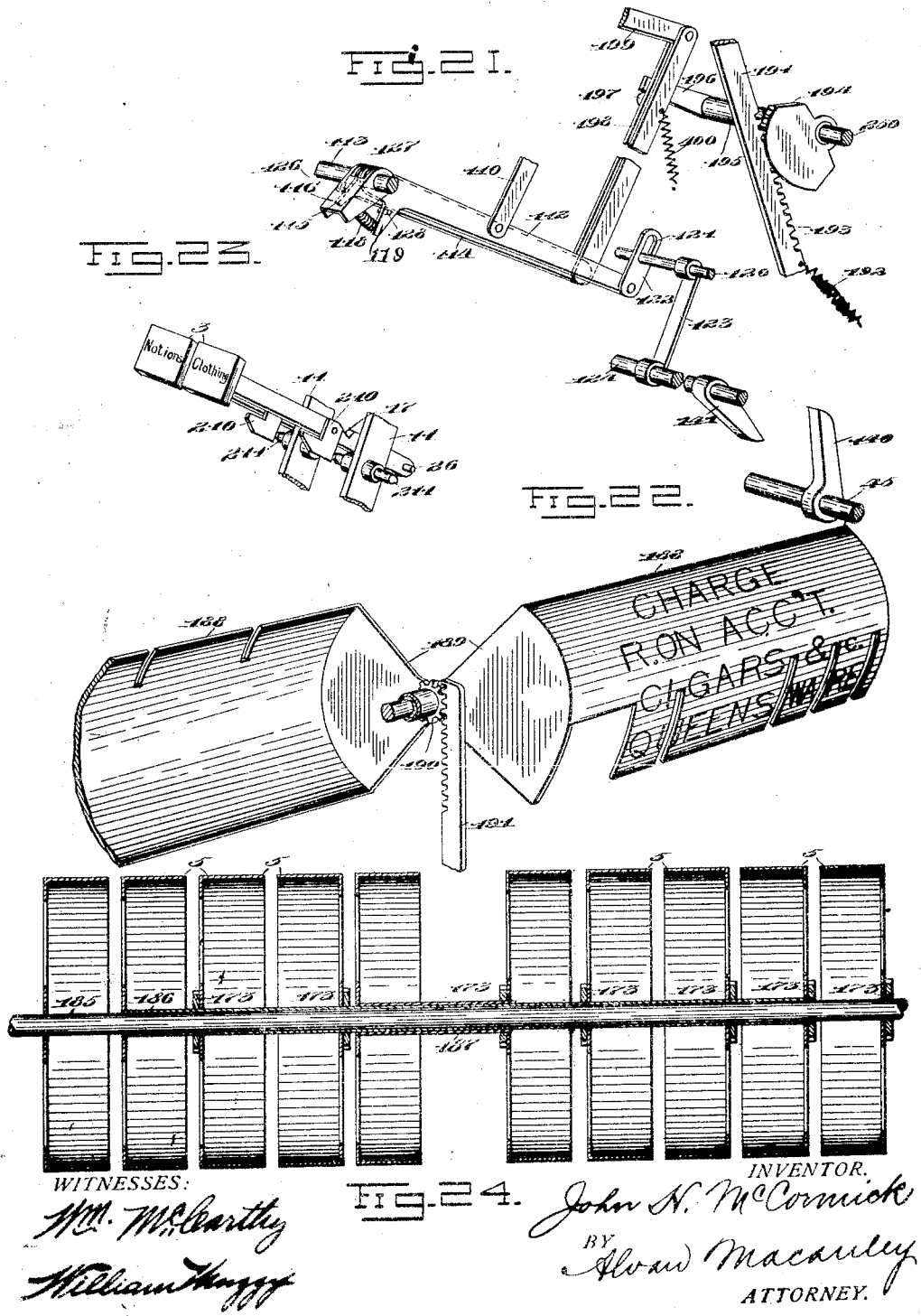

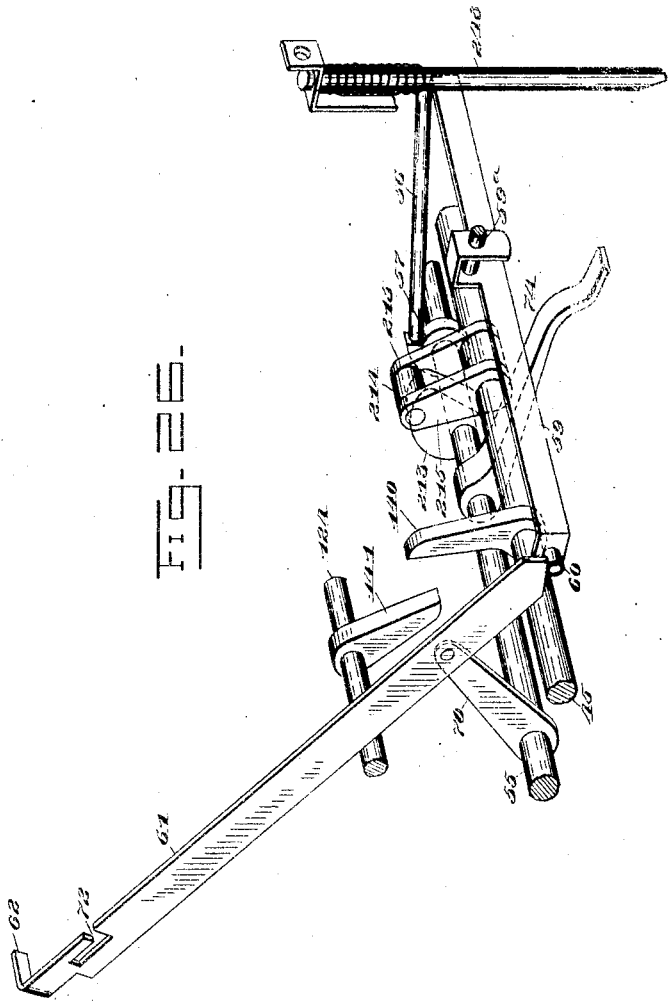

though the same. Fig. 11 represents an
UNITED STATES PATENT OFFICE.

JOHN H. McCORMICK, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,103,068.  Specification of Letters Patent.  Patented July 14, 1914.

Application filed January 2, 1906. Serial No. 275.

*To all whom it may concern:*

Be it known that I, JOHN H. McCORMICK, a citizen of the United States, residing at Dayton, in the county of Montgomery and State of Ohio, have invented certain new and useful Improvements in Cash-Registers, of which I declare the following to be a full, clear, and exact description.

My invention comprises a new or improved cash register. As shown in the drawings it is provided with a plurality of counters and is therefore of the type known as multiple or department counter cash registers. My invention, however, is not restricted to this or any particular form of cash register as it can be quite as well embodied in a machine having but one counter.

One object of my invention is to provide a cash register comparatively small, compact and easily operated.

A second object is to provide a machine which may be equipped with one or a large number of counters, as may be desired.

Numerous other advantages are comprised by my invention; the mechanism for accomplishing them will be hereinafter particularly referred to.

In the appended drawings forming part of this specification: Figure 1 represents a front elevation of a cash register embodying my invention; the cabinet, cash drawer and drawer casing being not shown. Fig. 2 represents an end elevation of the same, partly in section, and partly broken away. Fig. 3 also represents an elevation of the end of the machine opposite that shown in Fig. 2. Fig. 4 represents an end elevation similar to that shown in Fig. 3, partly broken away, and with the operating lever and gears omitted and a number of parts shown in broken lines. Fig. 5 represents a vertical transverse section on the line 5—5 of Fig. 1, but showing the cash drawer in position. Fig. 6 represents a view similar to Fig. 1 with the key board also removed. Fig. 7 represents an enlarged detail perspective view of two of the amount indicators and coöperating mechanism. Fig. 8 represents a rear elevation of my said machine, partly in section and partly broken away and with some of the parts omitted for clearness. Fig. 9 represents an enlarged detail top plan view, partly in section, of one of the independent counters. Fig. 10 represents an enlarged detail vertical section through the same. Fig. 11 represents an enlarged detail side elevation partly in section of one of the amount or value keys and coöperating parts, including one series of the graduated stop arms which coöperate with each bank of keys. Fig. 12 represents a detail end elevation of one of the blocks for mounting the counter shafts. Fig. 13 represents a detail side elevation, partly in section of one row or bank of counters of a modified form with their transfer mechanism and throw out devices for the retaining pawls. Fig. 14 represents a detail top plan view of one of the modified counters with the throw-out lever for its retaining pawls. Fig. 15 represents a detail vertical section through the modified form of counter. Fig. 16 represents a detail side elevation of the totalizing counter and the parts coöperating therewith. Fig. 17 represents an enlarged detail perspective view of one of the shafts carrying the graduated arms which coact with the keys, the flange of one of the gear segments thereon being broken away to expose the gear. Fig. 18 represents a detail perspective of a portion of the key board with the keys therein; said board being broken away to expose the arrangement of the walls therein. Fig. 19 represents a detail perspective view of one of the rock shafts carrying the trip arms and locking dog, and the latching collar with which the latter coacts. Fig. 20 represents a front elevation of the guard plate which extends over the front of the counters. Fig. 21 represents a detail perspective view of the coöperating levers for throwing the counters and setting the special indicators. Fig. 22 represents a detail perspective view of one of the special indicators, its operating gear, rack bar, etc. Fig. 23 represents a detail perspective view of two of the special keys and their locking plunger slides. Fig. 24 represents an enlarged detail vertical longitudinal section through the amount indicators the connecting shafts and sleeves, and Fig. 25 represents a detached detail view of the key-releasing plate 202, and Fig. 26 represents an enlarged detail perspective view of the shaft 55 hereinafter described, and parts carried thereby.

In the said drawings 1 represents the frame and various fixed parts of the ma chine, 2 the amount or value keys, 3 the special or department keys, 4 the cash drawer, 5 the amount or value indicators, and 6 the operating handle.

In general terms my improved machine may be described as comprising a single key board having amount and department keys, register operating mechanism coacting with said keys, a series of independent counters arranged to be brought into connection with said operating devices at will, amount indicators, special indicators, means for actuating the operating mechanism in connection with the cash drawer and a lever or handle for operating the mechanism independently of the cash drawer, when desired.

The amount or value keys 2 as shown in Fig. 1 of the drawings are mounted in five horizontal banks or rows of nine keys each and each row is numbered from one to nine whether it be units of cents, tens of cents, units of dollars, tens of dollars, or hundreds of dollars while the special or department keys 3 which are twelve in number are mounted in a single horizontal bank above the amount keys. The heads of the amount keys upon which the designating numerals are inscribed or otherwise affixed are preferably round, as shown, while the heads of the special or department keys are square whereby they may be readily distinguished from said amount keys.

The counters, as will be seen by reference to Fig. 6, are twelve in number and are arranged in four vertical tiers of three counters each. All of these counters except the lower one in the right-hand tier may be said to be independent of each other. This excepted counter, which registers the grand total of nine of the other counters, is arranged to be operated simultaneously with any of the other counters except the "paid out" and "charge" counters which are located above it in the same tier.

The amount indicators 5 as will be seen by reference to Figs. 1 and 24 are arranged above the counters in duplicate, oppositely facing sets, adapted to indicate at the back and at the front of the machine respectively.

With this brief statement of the relative arrangements of the several parts of my improved machine I will pass on to a detail description of the same.

The key-board or frame 8, in which all of the keys are movably mounted in the order above mentioned comprises two parallel spaced and connected apertured plates 9 and 10 and spaced dividing walls 11, extending perpendicularly from plate 10 about half of the distance toward plate 9, and each provided with notched flanges 12 (see Figs. 5 and 18), extending between and parallel to plates 9 and 10. The shanks of the keys which are preferably square in cross section, pass through the notches of these flanges and also through the guiding apertures formed in plates 9 and 10; each of said keys being normally held in its outer position by a coil spring 13 which surrounds its shank and bears against its respective flange 12 and a pin 14 mounted in said shank.

Each horizontal bank of keys including the special keys, is provided with a rock-rod 15 suitably journaled in the key board and having a series of rigid latch fingers or pawls 16 which are so arranged as to engage notches 17 and 18 formed in the key shanks.

Each of the rods 15 is provided near its left-hand end with a pin 19 (see Fig. 4) to which is connected a coil spring 20 mounted on the key board whereby said rod is normally rocked downward to cause its latch-fingers 16 to bear against the notched side of the key shanks. When the keys are in normal position the said fingers rest in the lower notches 18 of their respective key shanks but when a key is depressed its respective finger rides upward out of said notch and subsequently snaps into its notch 17 and thus holds the key in depressed position until the rod 15 is subsequently rocked to disengage said finger from the notch. When one of the fingers 16 is forced out of the notch 18 of its key, the shaft carrying said finger is rocked which results in the release of any other key in the same bank which may have been depressed. Thus if a mistake is made and the wrong key depressed, the error may be rectified by simply pressing the proper key in the same bank, which as above explained will release the first key. The rocking of the shafts 15 to release the keys during the normal operation of the machine is accomplished as follows: A sliding trip plate 21 (Fig. 2) is provided at the right hand end of the key board and is formed with elongated slots 22 through which projects headed screws 23 for movably securing said plates to said key board. The plate is also provided with a series of spaced pins 24 which coact with rock fingers 25 similar to fingers 16 and mounted on the respective rods 15, to rock said rods when the slide is moved longitudinally. This longitudinal movement of the slide is effected by the beveled end 201 (Figs. 1, 2 and 25) of a rearwardly and downwardly extending key releasing plate 202 which is movably mounted on the main frame by a slot and pin connection. The key-releasing plate is provided at its rear lower end with a pivoted bell crank pawl 203 one arm of which is normally held against a pin 204 mounted on the plate by a coil spring 205 connected to the pawl and to a pin 206 (see Fig. 2) mounted on one of two arms 44 hereinafter described. Longitudinal movement is imparted to the key-releasing plate by one arm 207 of a cam 208 carrying an additional and longer arm 209.

This cam is fast upon a rock shaft 55 which receives motion as hereinafter described. When the shaft rocks rearward the arm 207 raises and passes under the pawl 203; the latter springing back to normal position after the arm passes so that upon the return movement of said arm it will engage the rear end of said pawl and force it and consequently the plate 202 with the beveled lug 201 forward. The latter striking one of the pins 24 will move the slide 21 upwardly and release all the keys which have been depressed. This action therefore, is timed to take place near the end of the stroke of the operating handle or of the drawer and after the other parts have been actuated. The rocking of the rods 15 against the tensions of their springs as aforesaid retracts the latch-fingers 16 so that they disengage from the notches 17 and thus allow the depressed keys to assume their normal positions as above explained.

As the devices now to be described are duplicated in each of the several banks or horizontal rows of keys I will confine my description to one bank only as this will suffice for all.

The lower end of each key shank except the one designated "No sale" is provided with a laterally projecting pin or stud 26 (see Figs. 5 and 19) which, when the key is depressed contacts with and rocks one of a series of unlocking arms 27 fast to a rock-shaft 28. There is one shaft 28 for each bank of keys and therefore upon the depression of any key its shaft will be rocked to raise a locking-dog 29 mounted thereon, near the left hand end thereof. This arm in each case has a limited movement on its shaft being provided with a hub 30 formed in opposite sides with flaring slots 31 as best seen in Fig. 19. A pin 32 fast to the shaft projects through the slots 31 so as to play therein and is normally drawn forward by a coil spring 35 to cause the locking-dog 29 to engage a shouldered collar 33 fast to one of a series of transverse shafts 34 to lock the latter in position until a key is operated to raise said dog.

By the above described lost-motion-connection between the shaft 28 and locking-dog 29 the former upon the operation of a key moves through the greater part of its field of operation without moving the latch and only raises the latter sufficiently to release its shaft 34 after the key has been depressed far enough for its latch-finger 16 to engage its notch 17 and thus lock said key against return. This construction prevents any fraudulent manipulation of said keys and locks the operating devices against movement until a key is fully depressed and latched. The above description applies to both the amount keys and the special keys with the exception that the latter have not the arms 27, or latch 29, etc., but coact with arms 65 later described. Said special keys are so constructed that but one can be operated at a time. To this end I provide a series of angular plates 210 (Figs. 5 and 23) secured to the shanks of the department keys and coöperating with a series of sliding bevel ended plungers 211 mounted in spaced tubes 243 secured in the walls 11 (see Figs. 5 and 23). When one of the special keys is depressed its locking plate 210 passes down between two of the plungers 211 and thus crowds together all the remaining plungers upon both sides to prevent the descent of other plates between them in a manner well known in the art.

When an amount key is operated as before described its respective shaft 34 is released so that it may be oscillated upon the subsequent operation of one of the special keys, which operation permits the operation of the machine as hereinafter described. Each shaft 34 is provided with four segment racks 36 loose thereon and provided with side flanges 300 for keeping them from moving laterally out of mesh with the sliding counter operating rack-bars 38, which are arranged to operate the counters as hereinafter described.

While the segment racks 36 are loose upon the shafts 34 they are arranged to turn therewith but with a certain amount of lost motion. This result is effected by radial pins 41 mounted on the shafts 34 and projecting between spaced pins 42 mounted on the segments as shown in Fig. 17. This lost-motion-arrangement is, as will be subsequently described in detail, to permit one of the segments to be moved during a transfer from one counter wheel to the next of higher denomination without moving all the remaining segments of the same shaft. The said counter operating rack-bars 38 are arranged in four groups of seven bars each (see Fig. 6) five of which are operated directly by the segment racks 36 while the remaining two which are at the left hand side of each group, when released by the transfer devices hereinafter described are actuated by coil springs 212 (see Fig. 3). Each of these rack bars, as shown in Fig. 5, is provided with two guiding fingers 370 which together with the rear edges of said bars form guiding slots for the reception of transverse guide bars 301 which extend from side to side of the machine, suitable sleeves being mounted on said rods to hold the racks from any lateral displacement.

The segment racks on the shafts 34 are all rigidly secured thereon, except that provision is made for the lost-motion heretofore referred to, and each segment rack is in constant mesh with its counter-operating rack-bar, from which it results that if any movement be transmitted to one of the segment-racks or to the counter-operating rack-bars it will be transmitted through the respective shaft 34 and the other three racks and counter-operating rack-bars of the same denomination, will move simultaneously therewith. In like manner the four tens of cents counter-operating racks are arranged for simultaneous and equal movement; and so on through the series. The graduated movements imparted to a bar of one group will thus be duplicated by the corresponding bars of the remaining groups so that no matter which of the counters 7 is brought into connection with said racks as hereinafter described, it will receive the proper registration. Normally, that is between the successive operations of the machine, the counter-operating rack-bars are in their uppermost position, as shown in Figs. 1, 4, 5 and 6. When the machine is operated, however, the racks drop one space or more, up to nine, according to the numerical value of the operated keys. When each has dropped the proper distance it is stopped by means controlled by the operated amount or value key, and thereupon that counter which is controlled by the operated special key is brought into engagement with the racks. The cash drawer, crank lever or other operating means is then actuated to restore the counter operating rack bars to normal position. As the racks and counter wheels are at this time in operative engagement, this restoring operation, as will be readily understood, turns the counter wheels to register upon them the amounts of the operated value key or keys. In other embodiments of my invention the counter operating rack bars might be moved from normal position by suitable springs, or they might be positively controlled by the movement of some part of the operating mechanism.

In carrying out the operation as above outlined the amount or value keys may be all of the same length, as shown in the drawings. There are five horizontal banks of amount or value keys, consequently there are five shafts 34 and there are nine registering stops 40 arranged spirally on each shaft in graduated order, as shown in Figs. 11 and 17. One of the registering stops coöperates with each of the value keys in said bank. When a key is pressed, its inner end moves into the path of movement of its coöperating registering-stop. The distance between any stop and the inner end of its operated amount or value key depends upon the numerical value of said key. For instance, between the inner end of the "1" key in its depressed position and its registering stop, the distance is one unit; between the inner end of the "5" key when operated and its registering stop the distance is five units; between the inner end of the "9" key when operated and its registering stop the distance is nine units, etc.

In the machine shown in the drawings, besides the nine registering stops each shaft 34 bears four of the segment racks 36. The four segment-racks on the first of the five parallel shafts 34 are in constant mesh with the four units of cents counter-operating rack-bars 38. The segment-racks on the next lower shaft 34, are in constant mesh with the tens-of-cents counter operating-rack-bars. The segment-racks on the lowest shaft 34 are in constant mesh with the four, hundreds-of-dollars counter-operating rack-bars, etc.

The operation of any value key unlatches the locking dogs 29 as has been described and thereby unlocks the segments coöperating with that bank of keys in which the operated key is located, but said racks are still held in normal position until released by the subsequent operation of a special or department key, as will be presently described. When so finally unlocked and released the racks slide downward turning the segment-racks 36 and consequently the shaft 34 until one of the registering stops 40 strikes the end of the operated key, whereupon all four counter operated rack bars of that denomination are brought to rest. In like manner all the other counter-operating rack-bars which were unlocked by the operation of the amount key and subsequently released by the operation of the department key, are stopped at varying distances from their normal position according to the numerical value of the operated amount or value keys, as will be readily understood.

Shortly after the rack-bars have been brought to rest the counter or counters controlled by the operated department key are automatically brought into engagement with said racks as before referred to. Afterward by the operation of the cash drawer or of the crank or lever 6, the said racks are restored or driven back to normal position by mechanism which I shall now describe. Each of said rack bars excepting the sixth and seventh in each group is provided with an extension or bracket 41 by means of which it is normally supported in its upper normal position. These brackets are engaged and the racks upheld by a restoring frame 43 common to all of said rack bars and having spring-pressed plungers 42 twenty in number, that is, five for each of the four sets of counter-operating rack-bars. The restoring frame has at its ends rearwardly projecting arms 44 by means of which it is mounted fast upon a rock-shaft 45. The counter-operating rack-bars are therefore returned to normal position and held there by the restoring frame 43. The operation of a department key, through mechanism to be presently described, unlocks the restoring frame, whereupon it immediately begins to swing downward under the impulse of a spring hereinafter described and the springs under the transfer-plungers 42. During the early part of its movement its speed is retarded by the spring 91 which surrounds a pendent rod 92 which is hung upon a cross shaft 92ª, as shown in Fig. 5. The lower end of this spring presses against the collar 93 which is movable on the rod 91 and has trunnions 95 which are supported in bearings 94 in the upper ends of two rigid arms 96, fast upon the rock shaft 45. As the restoring frame begins its movement the spring 91 is compressed, but as the restoring frame moves farther downward the trunnions cross the dead center between the rock-shaft 45 and the cross-shaft from which the rod 92 is hung, and immediately the spring 91 begins to expand and thereafter assists the descent of the restoring-frame. The movement of the latter is thereby somewhat accelerated. The restoring frame has a constant travel which it traverses at each operation of the machine regardless of the particular keys operated.

On its return movement the plungers of the restoring frame strike the brackets 41 and thereby carry the counter-operating rack-bars to normal position. The latter are positively stopped at normal position by devices to be presently described, but nevertheless the restoring frame 43 continues to ascend a short distance, the effect of which is to depress the plungers in their sockets and compress the springs under them, whereby when the counter-operating rack-bars are in normal position said plungers exert a tendency to force them farther upward. When one of the registering wheels of a counter has made a complete revolution it is arranged to unlock the rack bar which turns the adjacent counter wheel of next higher denomination, whereupon the compressed spring under its transfer plunger 42 raises the said rack-bar a short distance and just far enough to turn the said registering wheel of next higher denomination one notch and thereby effect the transfer. The specific means employed to effect the transfer will be more fully explained hereinafter.

As previously stated the restoring frame may be swung upward to normal position by an operation of the handle 6, or if preferred by closing the drawer. In either event there is a cam 213 secured upon the rock shaft 55. Resting at all times upon the periphery of the cam is an anti-friction roller 214 which is carried upon the front or swinging end of the arm 215 which is rigidly secured to the rock-shaft 45 to which the restoring frame is also secured. In Figs. 2 and 5, the restoring frame, the actuating cam 213 and the arm 215 are shown in normal position in which the anti-friction roller 214 rests upon the high part of the operating cam, thereby maintaining the restoring frame in its highest or normal position. It will readily be understood that the restoring frame cannot descend except as the operating cam turns toward the rear. The operating cam, however, and its coöperating parts are normally locked in the position shown and are released by the operation of a department key. The operating cam, normally tends to swing rearwardly under the impulse of the spring 47 which is secured at one end to a fixed part of the frame of the machine and at the other to the swinging end of the lever 48 which is fast upon the left-hand end of the shaft 49. Secured also upon this shaft but outside the frame of the machine is the handle 6. Also upon the shaft 49, but within the frame of the machine, is secured a gear-wheel 51 which meshes with a pinion 52 loose upon the shaft 45. The said pinion carries a gear wheel 53 which in turn meshes with a pinion 54 fast on the rock shaft 55. The operating cam 213 is prevented from turning rearwardly and consequently the restoring-frame is maintained in elevated position by a locking cam 57 (Figs. 2 and 26) which is fast upon the rock shaft 55. A locking bar 56 extends toward the front of the machine and its front end abuts against the square face of the locking-shoulder of the said cam and thereby prevents said shaft from turning. At its rear end said bar is secured to and carried by the downwardly, spring-pressed drawer-latch or plunger 248 which is suitably journaled in the main frame and arranged to engage the latch-plate 58 mounted on the rear of the drawer to hold the latter normally locked and in closed position. It will readily be seen that so long as the drawer plunger is in its downward or normal position the shaft 55 and its coöperating parts will be locked. When, however, the drawer plunger is raised by pressing one of the department keys the locking rod 56, which is carried thereby, will be also raised and the shaft 55 will be thereby unlocked and free to turn under the impulse of its springs or motors. The restoring-frame thereupon swings downward, and, simultaneously the lever 6 swings upward. To swing the restoring-frame upward to normal position and thereby complete the operation of the machine it is only necessary to force the lever 6 downward to its normal position shown in Fig. 3.

The means for raising the drawer-plunger 248 consists of various parts intervening between said plunger and the series of department keys. It comprises a lever 59

(Figs. 8 and 26) pivoted at 59ª to the frame of the machine. At its outer end it is provided with an anti-friction roller 60 which is located under the rearward beveled end of the drawer opening bar 61. A side view of this bar partly in broken lines appears in Fig. 2, from which it will be seen that near its rear end it is pivoted to the upward end of a link 70 which turns freely upon the shaft 55. The front end 62 of this drawer-opening bar is bent at right angles, as shown in Fig. 6, in proximity to, but normally out of the path of, a finger 63 rigidly secured upon the transverse shaft 64 which extends under all of the department keys and has a series of eleven short arms 65, one for each department key, except the "no sale" key which is arranged to press directly upon the bent end 62 of the drawer opening bar. The "no sale" key thus releases the drawer independent of the operation of the cash keys. The arms 65 are in the path of movement of the department keys whereby when one of the latter is pressed in it strikes its short arm 65 and thereby the said transverse shaft 64 is rocked whenever a department key is operated. The department keys are not normally locked and can be pressed in at any time, and likewise the cash keys are not normally locked and can be pressed in at any time, but the proper cycle of operation of the machine requires one or more of the amount keys to be pressed before the department key is pressed for otherwise since the front end of the drawer opening bar 61 is not in the path of movement of its finger 63, the pressing of a department key would accomplish nothing.

If the machine be properly operated the pressing of an amount or value key raises the front end of the drawer opening bar 61 into the path of the finger 63 and when thereafter a department key is pressed the drawer will be properly opened. This raising of the front end of the drawer opening bar 61 into the path of the finger 63 is accomplished by a slide 67 shown in broken lines in Fig. 2, and movably mounted upon the main frame by slot and pin connections. Said slide is provided with a series of pins 68 which are arranged to be engaged by arms 69 one of which is fast to each shaft 28 near its left-hand end, whereby when said shafts are rocked by the operation of the amount keys, the slide 67 will be moved longitudinally. The forward end of the drawer-opening bar 61 rests upon the upper one of the pins 68 whereby as the slide 67 moves upward it swings the drawer-opening bar into the path of the finger 63.

In order to prevent the releasing of the drawer when an amount key is only partly depressed I provide a stud or projection 71 which is secured to a fixed part of the machine and coöperates with an angular slot 72 formed in the slide 61. If it be attempted to operate a department key when an amount key is but partly pressed in, it will readily be seen that the finger which is formed by the angular slot will strike the projection and prevent the operation of the department key. The "no sale" key, as has been stated, is arranged, when operated, to press directly upon the bent end 62 of the drawer opening bar. The "no sale" key of course should never be used in connection with any amount key and my construction makes it impossible to thus improperly operate the machine, for, if an amount key be pressed the bent end of the drawer operating bar will be raised so far that it is out of the path of the "no sale" key and hence if the "no sale" key be pressed after an amount key is operated, no result will be accomplished.

As the present improvement contemplates operating the machine either by the handle 6 or the cash drawer 4 the latter is provided at its rear side, as shown in Fig. 5, with a bracket 72 carrying an anti-friction roller 73 which latter is adapted when the drawer is being closed to contact with and swing upward the motor lever 74 fast to the shaft 55. The motor lever is so connected to the main frame by a coil spring 75 that when the drawer is closed the spring is put under tension. When the parts are released by the operation of one of the department keys as before described, the spring 75 draws the lever 74 down and helps to open the drawer, thereby also rocking the shaft 55 and imparting movements to the gears and other parts connected thereto as aforesaid.

It will be observed from the above description and reference to the drawings that the springs 47 and 75 subserve substantially the same purpose as they both exert their tensions to open the cash drawer, elevate the operating handle and actuate all parts connected to the shafts 49 and 55.

In order to compel a full stroke of the frame 43 upon each operation of the machine I provide (Figs. 3 and 4) a link bar 76 and pivot the same to said frame and to a crank pin 79 fixed to a ratchet wheel 77 journaled on the main frame. The ratchet wheel is engaged by a retaining pawl 78 also mounted on the main frame whereby any retrograde movement of the same is prevented. The said crank pin 79 is apertured to receive a guide rod 80 which is pivoted on the main frame and carries a coil spring 81. One end of this spring is connected to the link 76 so that when the wheel 77 is rotated by the downward movement of the restoring frame the spring is compressed. The crank pin 79 passes the dead center between the journal of the ratchet wheel and that of the guide rod 80 just before the restoring frame reaches its lowest position whereupon the spring 81 expands and throws the crank pin well past dead center position and permitting the restoring frame to be raised. In like manner the spring 81 being stretched as the crank-pin approaches the opposite dead center throws the pin past it so that the restoring frame may be dropped when the machine is again operated. As an extra precaution against such a partial manipulation of an amount key as would enable the operator to release the machine by operating a special key I provide a locking frame 82 which is mounted so as to slide on the main frame and is normally drawn forward by a coil spring 83 which connects it to the main frame (see Fig. 3). The forward end of this frame is formed with a bevel edge 84 which normally lies in the path of an antifriction roller 85 mounted on a slide 86. This slide is secured by slot-and-pin connection to the key board and is provided with a number of pins 87 which rest against arms 88 fast to the shafts 15. By this construction when any amount key is being operated the slide 86 is moved longitudinally which causes the roller 85 to move the frame 82 down and rearwardly against the tension of its spring. This movement of the frame 82 locks the frame 43 against movement by causing the notch 89 formed in said former frame, to straddle the pin 90 mounted on the fame 43. The latter frame remains so locked until the amount key has been fully depressed when the shafts 15 again rock back to their original positions and release the slide 86 which permits the frame 82 to assume its normal position, thereby releasing the restoring frame 43. The slide 86 further carries a pin 249 which is arranged to engage and operate an arm 250 fast to the shaft 15 of the special keys whereby if a special key be accidentally operated before an amount key, the operation of the latter will release said special key. In such a case however the amount keys must also be released so that the operation may be commenced anew. To release any amount key a key in the same bank is given a partial depression to rock the shaft 15 of said bank which will release all operated keys in said bank.

Having now described the mechanism for imparting variable movement to the counter-operating rack-bars 38 according to the values of the keys operated I will pass on to a description of the counters 7 which coöperate with the respective sets of bars. As before stated the lowermost counter in the right hand row of counters is the grand-totalizing counter and it is arranged to be thrown into operative relation with its respective set of rack-bars upon each operation of the machine, except such operations as are made to record "paid out" and "charge" transactions. The latter are recorded on the two counters immediately above said grand-totalizing counter.

As each of the twelve counters is substantially of the same construction and operation I will confine my description to one only as this description will suffice for all. Each comprises a grooved shaft 97 and seven counter wheels (Figs. 9 and 10,) journaled thereon and provided each with a spring-pressed pawl 98 which is arranged to bear upon said shaft so as to engage the groove therein when the shaft is rotated. Each of said counter wheels is inscribed about its periphery with the digits from zero to nine inclusive and is provided with a pinion 99 upon its right-hand side and a transfer cam 100 upon its left-hand side. The shafts 97 have squared ends which are slidably mounted in grooves 101 (Figs. 6, 9 and 12) formed in rotary blocks 102 which are mounted in the main frame and are held against lateral displacement by pins 103 which project into annular grooves 104 formed in said blocks.

By reference to Figs. 1 and 6 it will be seen that from this construction it results that all of the counter-shafts in each horizontal row are coupled together so that they may be simultaneously rotated to turn all of the counter wheels to zero. This rotation is effected by any suitable tool of the nature of a screw-driver applied in the groove of the right-hand end block 102. By means of the sliding connection between the counter shafts and the blocks 102 the said shafts may be independently swung rearward when the counters are to be thrown into mesh with the counter-operating rack-bars.

Each of the counter shafts is further supported at its ends in the counter frame 105 having two arms 106 in which the journals for said counter shaft are formed. The said frames are themselves journaled upon the three transverse shafts 107 four being upon each shaft and they are each provided with a series of springs 108 which engage bell-crank retaining pawls 109 pivoted on their respective shafts 107 and engaging the pinions of the counter wheels to lock them against retrograde movement and to aline them so that the figures upon their peripheries will all be in horizontal alinement.

The counter frames are arranged to be rocked on the shaft 107 to bring the pinions 99 into mesh with the counter-operating rack-bars, through the medium of link-bars 110 (see Figs. 5 and 21) which are connected to lugs 111 formed on said counter-frames and to a series of twelve counter-adjusting levers 112 loosely mounted on a transverse shaft 113. There is one such lever for each counter. The shaft 113 further supports a series of special-indicator adjusting levers 114 arranged beside said levers 112 and each formed with a nose 115 by means of which it is rocked on the shaft 113 to elevate its rear end to which one of the links 198 is jointed and thereby to set a special indicator as hereinafter described. The coil springs 400, one of which is connected to each link 198 tends always to throw out any counter which might be in engagement with its rack-bars; or, in other words, it tends to restore the counter adjusting levers 112 to normal position should they be displaced therefrom.

The rocking of the special-indicator adjusting levers 114 is effected by a series of rock frames 116 also pivoted on the shaft 113 and arranged to be forced forward to engage the noses 115 upon the operation of the special keys. To accomplish this result the inner end of each special key except the "no sale" key is arranged to contact with and operate one of a series of short-curved arms 117 pivotally mounted on one of the shafts 28. As the latter is forced downward it strikes its respective frame 116 and swings it downward. This downward movement of the frame beside raising its special-indicator adjusting lever 114 also compresses a spring 118 which lies between the frame and a pendent finger 119 formed on its respective lever 112. This latter lever however is prevented from rising at this time under this spring impulse by a transverse rod 120 which extends through an elongated slot 121 formed in a link 122 pivoted to said lever. The rod, 120 (Figs. 5 and 21) is movably supported in position by a series of arms 123 which are journaled upon a rock-shaft 124. Said rod 120 is normally drawn forward into locking position by a coil-spring 125 which is connected thereto and to a suitable stationary part of the machine. Each of the levers 112 and its link 122 forms in effect a toggle which normally occupies the position shown in Fig. 21, with the shaft 120 at the bottom of the slot 121 whereby said lever 112 is locked against operation or upward movement and the counter connected thereto through link 110, is locked in inoperative position.

Each of the frames 116 (Figs. 5 and 21) excepting those of the aforesaid "paid out" and "charge" counters is provided with an internal laterally projecting pin 126 which when the frame is rocked contacts with and operates one of a series of radial pins 127 mounted on the shaft 113, to rock the latter. This rocking of the shaft 113 adjusts the mechanism of the totalizing counter so that said counter will be thrown into operative position as hereinafter more fully described. Each of said levers 112 is provided near its upper end with a pin 128 which projects under its auxiliary lever 114 whereby when the latter is drawn down as hereinafter described the lever 112 will be returned to normal position therewith.

The rock shaft 124 upon which are secured the arms 123 upon which the toggle links 122 are pivoted, is rocked so as to destroy the indication of the kind of special transaction registered, by the operation of any cash key and in the following manner. As before explained when one of the amount keys is operated the forward end of the drawer-opening bar 61 is raised which action also elevates a bell crank lever 130 pivoted on said bar (see Fig. 2). The lower end of this bell crank is normally drawn forward by a coil spring 131 which connects it with the said bar, so as to cause its lower notched end to engage a pin 132 mounted on a lever 133 which is pivoted on the main frame. This latter lever carries two spaced lugs 134 which embrace one end of a bell crank lever 135 mounted on the outer end of the heretofore mentioned rock-shaft 124; consequently when an amount key is operated the forward end of the drawer opening bar is raised, the bell crank lever 130 carried thereby is also raised and it in turn lifts the lever 133 and the latter raises the front end of the bell crank lever 135, thereby rocking the shaft 124. When the bell-crank 130 nears the upper limit of its stroke it trips against a stationary trip arm 136 mounted on the frame and thus releases the pin 132 and allows the lever 133 to descend.

When a machine embodying my invention is in practical use there will be always some one of the special indicators exposed to view and indicating the character of the last recorded transaction; and in like manner in the particular embodiment of my invention as shown in the drawings, there will be normally one of the counters in engagement with the counter-operating racks. It results from the above that one of the counter adjusting levers 112 and its special indicator-adjusting lever 114 will be always raised above normal position. The parts are so shown in Fig. 5, in which one of the counter-adjusting levers is shown in raised or operative position. One of the special indicator-adjusting levers 114 is also in raised position, but cannot be shown in Fig. 5 as it is hidden behind the counter adjusting lever 112. In like manner the section line upon which Fig. 5 is taken, prevents one of the counters being shown as in engagement with its counter-operating rack-bars. One of the counters is, however, normally in such engagement but as soon as the operator in the operation of recording the succeeding transaction, presses an amount or value key, the said counter is thrown out of engagement because the pressing of the amount key rocks the shaft 124 and thereby swings the rod 120 backward and out of the path of travel of the ends of the counter-adjusting levers 112. When the rod 120 is in normal position the link 122, pivoted upon said counter adjusting lever at one end, and in effect to the bar 120 at the other, prevents any counter-adjusting lever from moving upward, as will be readily understood, and consequently prevents any counter from being thrown into engagement with its counter-operating-rack-bars. When, however, an amount key is pressed, through the mechanism already described, during the inward movement of said key, the bar 120 swings rearward its full distance and then snaps back to normal position. As said rod is swung backward out of the path of the operated counter-adjusting lever, the slotted end of the link 122 also swings rearwardly and thereupon the coil spring 400 which is attached to the link 198 of the operated special-indicator adjusting-lever promptly swings the latter down to normal position. The coöperating counter-adjusting lever 112 carries the pin 128, as has been said, upon which the said special indicator-adjusting lever rests, whereby when the spring 400 brings the special-indicator adjusting-lever to normal position, it will also throw out the engaged counter by forcing the counter-adjusting lever back to normal position. To throw in the counters a forwardly-extending arm 140 (Fig. 16) is secured to the rock shaft 45, to which the restoring frame is also secured. Coöperating therewith is a downward and rearwardly-extending lever 141 which is secured upon the rock-shaft 124, from which it results that whenever the restoring frame swings downward the arm 140 swings forward and striking the arm 141 rocks the shaft 124 and swings the bar 120 to the rearmost limit of its movement. It is at this time that the counter which is controlled by the operated department key is thrown into engagement with the counter operating racks, for it will be remembered that when the department key is pressed it swings inward the frame 116 (see Fig. 21) thereby compressing the spring 118 and putting a tension under the counter-adjusting lever 112. The latter would immediately swing upward to throw its counter into operative engagement, but that it is locked from such engagement by the bar 120. The operation of a department key also releases the restoring frame and it immediately moves downward. As it nears the lower extreme of its movement the arm 140 rocks the shaft 124, as previously described, and swings the bar 120 rearwardly, thereby unlocking the counter-adjusting lever 112, which immediately swings to the upper position shown in Fig. 5, under impulse of the compressed spring 118. While the restoring-frame 43 is in its lower position the rod 120 is held in its rearward position having moved backward in the slot 121 and in this upper position of the counter-adjusting lever, the link 122 instead of pointing upward as it normally does at this time points slightly downward. When the restoring frame is returned to normal position the spring 125 brings the bar 120 also back to its normal position, thereby swinging forward the slotted end of the link 122 so that the slotted end of said link now extends downward instead of upward as normally. When in this position the said link locks the coöperating counter in operative position and the latter cannot be thrown out or disconnected until the bar 120 is again thrown backward, which occurs upon the subsequent operation of an amount key, as already fully described. It will thus be seen that the rod 120 is swung rearwardly twice during each operation of the machine. First when an amount key is pressed, and a second time, later, as the restoring frame swings downward after being released by a department key.

When the drawer-opening bar 61 is moved longitudinally without first being raised, as it does when the "no sale" key is operated, a spring pressed pawl 137 mounted thereon engages and operates the bellcrank lever 135 to give the shaft 124 its first rocking movement. This pawl 137 is tripped to allow the lever 135 to return by a trip arm 138 (shown in broken lines Fig. 2) fast to the main frame.

As has been mentioned the rocking of the shaft 113 upon the operation of any of the special keys excepting the "paid out" and "charge" key, will result in throwing in the totalizing counter. The construction for effecting this operation is more clearly shown in Fig. 16 and comprises a bell-crank lever 142 fast to said shaft and formed in one of its arms with a suitable aperture through which projects a stud 144 fast to a lever 145 also journaled on said shaft. A coil spring 146 is mounted on said stud and bears against the apertured arm of the bell crank. The remaining arm of said bellcrank lever forms a stop by bearing against the top of the lever 145. The lever 145 is connected to the totalizing counter and the shaft 124 substantially in the same manner as the levers 112. The grand total counter is thrown into operative engagement with the rack-bars whenever any department or special key is pressed, except the "charge", "paid out", or "no sale" keys. The "no sale" key is not properly a department key because it does not coöperate with the counters here shown. The frames 116 which coöperate with the department keys, except those just mentioned, have each a laterally extending pin 126, and for each of such pins there is a coöperating pin 127, the latter all projecting from the shaft 113 whereby when any department key, except those just mentioned, is pressed the shaft 113 is rocked, which swings upward the bell crank lever 142 and compresses the spring 146, thereby putting a tension under the grand total counter-adjusting lever 145. When the machine is subsequently operated as previously described the grand total counter will be properly thrown into mesh with the counter-operating rack-bar. When the "charge", "paid out", or "no sale" keys are operated their frames 116 turn upon the shaft 113 without rocking it, so that in this case the grand total counter is not operated.

The transfers between the wheels of the respective counters is accomplished in the following manner (see Figs. 4, 5, and 13). After one of the counter wheels has made a complete revolution which equals one unit of the wheel of next higher denomination its trip cam 100 engages a trip-lever 147 and rocks the latter rearwardly. There is of course one trip-lever for each counter-wheel except that the wheel of highest denomination in each counter has none. The trip levers are journaled upon transverse rods 148 and each vertical row is coupled by a link 149. The upper trip lever in each vertical row is provided with a locking arm 150 which normally engages under a lug 151 formed on one of a series of stop pawls 152. Each pawl is journaled on a transverse shaft 200 and is provided with a coil spring 153 which draws its rear end downward to cause its projection 151 to bear upon its respective locking arm 150. These springs 153 are connected to the respective bars or links 149 so as to normally tend to draw the same upward.

The upper transfer lever 147 of each vertical set of counter-wheels is connected to the transverse shaft upon which it is mounted by a slot and pin connection 217, the office of which is to allow the said levers to rock without moving the shaft but when the shaft is rocked the pins engage the walls of the slots and rock the levers to bring the locking arms 150 under the projections 151. This rocking of the shaft is accomplished by an arm 241 mounted thereon and arranged to be engaged and elevated by a pin 242 mounted on the link 222. (See Fig. 4.) Each stop pawl 152 is normally supported by its arm 150 in the proper position to hold a locking nose 154 formed thereon in the path of a shoulder 155 formed on its respective counter-operating rack-bar 38 and said nose forms a stop for the latter in its upward movement (see Figs. 4 and 5). The counter wheels being normally out of mesh, are a little distance from the ends of the transfer arms or levers, but when any counter is swung into mesh with its operating racks the transfer cams are swung in so close that in turning on the counter shaft 97, when they reach a certain point they will contact with the upper end of the transfer arms and swing the latter rearward. The locking-arm 150 will be thereby swung to the rear from under the projection 151 and the spring 153 will thereupon swing the rear end of the stop pawl 152 downward; the upper end of the locking arm 150 fitting meanwhile in the notch between the upper end of the spring 153 and the projection 151. This of course swings the nose 154 upward so that the rock-bar being, as heretofore stated, normally under the tension of its plunger 42 is by said spring forced upward past normal position far enough to advance the adjacent adding wheel of higher denomination one notch, as usual in transfer devices. This additional upward movement of the counter-operating rack-bar to effect a transfer, occurs after its regular registering movement which returns it to normal position.

After the stop-pawls 152 have been released and allowed to rock upon their pivots they must be returned to their original positions so that the locking arms 150 can again pass under the extensions 151 to again place the nose 154 in position to prevent excessive movement of the rack-bars. This result is effected by the rocking of the shaft 200 which has a slot and pin connection 218 with each stop pawl as better shown in Fig. 5. When one of the pawls is released it is stopped in its rearward movement by its pin 218 abutting against the forward wall of its slot. Now should the shaft 200 be rocked the pawl will be returned to its normal position and the arm 150 will thereupon be drawn up to locking position under it. This return of the pawl accompanies the downward movement of the frame 43 and thus takes place during the following operation of the machine. To this end an arm 220, is fast to the frame 43 so as to move therewith and is connected to a crank arm 221 mounted on the shaft 200 by a link bar 222 as better shown in Fig. 4. By this means the pawls can be tripped independently of the shaft 200 or of each other but are all returned simultaneously to normal position upon the rocking of the shaft and thus force all the rack bars down to proper normal position.

In the modified form of turn to zero devices shown in Figs. 13, 14 and 15, the turn-to-zero pawls on the counter wheels are omitted and in lieu of the same said counter wheels are provided with notched flanges 237 and the counter shafts with helical springs 238 fast thereto. Each of these springs is formed on its free end with a spring loop 239 which is arranged to bear against its respective flange 237. When the counter wheels are rotated the springs are wound until the loops 239 commence to slip over the notched flange. If the lever 223 is now operated to release the counter wheel as hereinafter described the same are turned to zero by the tensions of the springs and arrested at the zero positions by the arms 147. When it is desired to return the counter wheels of this modified form of counter to zero the shaft 97 must be rotated as before described but before so doing the pawls 109 must be disengaged from the pinions 99 as the counter wheels are moved backward in this instance and the transfer-levers 147 must be moved forward to form stops for arresting the counter wheels at the zero position. These combined results are accomplished by the pivoted lever 223 mounted upon the main frame and normally drawn downward by a coil spring 224 which connects it to said frame, as shown in Fig. 13. This lever carries a pivoted link 225 which in turn is pivotally connected to three crank arms 226 mounted on the ends of the respective shafts 107 so that when said lever is depressed the shafts will all be simultaneously rocked. Each of the retaining pawls 109 is formed with a slot 227 into which projects one of a series of pins 228 fast to said shafts 107 (see Fig. 14). By this construction the pawls are free to play over the teeth of the pinions but are disengaged from the same upon the lever 223 being operated. The upper shaft 107 (Fig. 13) also carries a stop arm 229 for an arm 230 mounted on the upper shaft 148 to limit the forward movement of the transfer arms. When the arm 229 is moved forward all of the arms 147 are also moved forward into position to arrest the cams 100 carried by the counter wheels when the zero position is reached. It will be observed that the springs 153 normally hold the links 149 raised, so that the pins on the upper shaft 148 lie in the lower ends of the slots formed in the upper levers 147 and thus allow the latter to move independently of the shaft.

The amount indicators 5 as better shown in Figs. 1 and 24 are arranged in two groups of five each; said groups being arranged to indicate at the back and at front of the machine respectively. Said indicators are of the rotary type and have the digits from "0" to "9" inclusive, inscribed or otherwise affixed upon their peripheries as is common in the art. The indicators receive their movements from the rack bars 38 which actuate the counters, in the following manner. Certain of the brackets 41 which are most convenient for the purpose and represent the desired banks of keys are provided with anti-friction rollers 158 (see Fig. 5) which project into elongated slots 159 formed in levers 160 which are journaled on the shaft 124. As these levers are all practically the same I will describe one only as this description will suffice for all. Each lever as better shown in Fig. 7 is formed at its inner end with a yoke 161 which is journaled on said shaft 124 and thus braces the lever in position thereon.

The rear ends of levers 160 are adapted when actuated by the descent of the rack bars to engage and elevate anti-friction rollers 162 mounted on levers 163 which are also journaled on the shaft 124. These latter levers are formed at their rear ends with elongated slots 164 through which project screws 165 mounted on the lower ends of slide bars 166 (see Fig. 7). A series of coil springs 167 are mounted upon the shaft 124 so that their rear ends bear respectively upon the levers 163 while their forwardly projecting ends are formed into loops 168 which extend over the levers 160. By reference to Fig. 7 of the drawings it will be observed that the rear ends of the springs 167 normally exert their tensions to draw the loops 168 downward and as these loops engage the levers 160 the latter are drawn downward also. The springs 167 do not exert their tensions to draw the levers 160 down until after the downward movement of the frame 43 has commenced. This peculiar action is secured in the following manner: When the restoring frame 43 moves upward a projecting lip 231 mounted thereon engages and lifts the forward ends of said springs 167 and thus relieves the loops 168 from any downward pull. After the frame commences its downward movement the lip 231 releases the springs and they draw the loops and levers 160 which have been released downward to assist in the descent of the racks.

The levers 160 are relieved of the pressure of the springs 167 when in their upper positions so as not to interfere with the transfer movements of the rack bars which are effected by the spring plungers 42 and of course also elevate the levers 160. To further assist the descent of the levers 160 but still relieve them of any restraint during the transferring movements, I connect each to the restoring-frame by a coil spring 232. When the frame is in the normal position shown in Fig. 5 the tension of the springs is relieved so that the levers can move upward freely, but just as soon as the descent of the frame commences the springs are put under tension to assist in drawing the levers 160 downward. By the above described means when the levers 160 are operated to raise the levers 163 and the latter are subsequently left elevated upon the return of the levers 160 to normal position, the said springs 167 are put under tension to return the levers 163 to normal position when they are released. Said levers 163 and the indicator rack-slides 166 are held in elevated positions by latch frames 169 which are arranged to engage locking or alining teeth 170 formed on said slides (Figs. 5 and 7). The slides are guided by slotted transverse bars 171 and are provided near their upper ends with rack teeth 172 which engage the operating pinions 173 of the indicators 5. The aforesaid frames 169 are fast upon a transverse rock shaft 174 provided with two spaced pendent bars 175. These bars carry a laterally projecting spring pressed plunger 176 and are connected at their lower ends by a web or wall 177 which lies against the forward end of a locking cam 178 mounted fast on the shaft 55 (see Fig. 7).

When one of the special keys is operated and the shaft 55 rocked as before described the cam 178 swings upward from the wall 177 and releases the bars 175 so that the same may be subsequently swung rearward by the coil spring 180, to rock the shaft 174 and disengage the frames 169 from the alining teeth. As the shaft 55 makes its rearward movement the plunger 176 passes down through an incline cam groove 181 formed in a pivoted bell crank 182 and is thereby depressed until it finally passes free of said groove and snaps out in front of the bell crank. The bell crank is pivoted upon an arm 183 which is fast to the shaft 55 and is held in its normal position shown in Fig. 7 by a coil spring 184 which is interposed between it and the shaft 55; one arm of said crank contacting with the shaft to limit the movement imparted by the spring.

When the operating handle is actuated after the parts have moved to the positions above described the pin 176 is forced forward by the cam periphery of the bell crank and thus causes the frames 169 to be forced rearward to engage and lock the slides 166. During this movement the spring 184 is depressed so that when the upper end of the bell crank passes below the pin, said bell-crank will be forced outward to its normal position to bring the pin in alinement with its groove. Just before the pin disengages from the bell-crank, the cam 178 again engages the wall 177 and thus holds the arms 175 in position until a special key is again operated.

As before stated the rack teeth on the upper ends of the slides 166 are adapted to actuate the respective indicators but as these indicators are arranged in duplicate sets for indicating back and front respectively, provision must be made for moving said duplicate indicators in unison. To accomplish this result the two outside indicators are fast upon the indicator shaft 185 (Fig. 24) so as to move in unison while the next two outside indicators are mounted fast upon a sleeve 186 journaled on said shaft. This sleeve in turn forms a journal support for a sleeve 187 which connects the two innermost indicators, for which see Fig. 24. The four intermediate indicators are operated separately, but as there are quadruplicate rack-bars 38 in different lateral positions in the machine, the connections for duplicating the slides 166 are easily made. In the coupled series of indicators it is of course only necessary to operate one indicator in each set as such movement will actuate both as above described.

As my machine as shown in the drawings, is arranged to register transactions of eleven different classes, there are of course means for indicating, through the usual opening in the case of the register, eleven different classes of transactions. To this end I provide three special indicators, one of which with its left hand side partly broken away is shown in Fig. 22. Each consists of two curved shields 188 upon the convex faces of which are the distinguishing designations of the different classes of transactions for which the machine is arranged. Fig. 22 presents a rear view of the inner one of the three special indicators from which it will be seen that the lower edge of the left hand shield 188 and the upper edge of the right hand shield have parallel slots through which the various adjusting racks pass when the special indicators are swung into or out of position. As clearly shown in the drawings, a web 189 connects the left hand end of the front shield and the right hand end of the rear shield. At the center of said web it is provided with a suitable bearing through which the indicator shaft passes, and the opposite ends of the shields each has a web 189ª (Fig. 2) which are also journaled upon the indicator shaft. Of course the same designations are inscribed upon the right hand or front shield 188 as upon the left hand or rear shield, though their order is reversed, and there are four designations upon each. For instance, in Fig. 22 the left hand or rear indicator has the designation "Charge" at the top, the designation "Queensware" at the bottom, etc., whereas this order is just reversed upon the front shield. Fig. 5 shows a sectional view through the three right hand or front shields, from which it will be seen that they are nested, as also are the left hand or rear shields. The front shields always show through the front of the cabinet and prevent the right hand set of amount or value indicators from being shown there-through, so that an indication reads from the front of the machine, for example, "$1-7.32 groceries," meaning that a transaction involving that amount of groceries has just been made and properly registered upon the machine. The designations on the rear shields of the special indicators show through the rear of the machine and the left hand set of amount or value indicators is hidden thereby, from which it will be readily understood that the machine indicates exactly the same whether viewed from the front or the rear.

The special indicators of course must be moved different distances at different times according to the operated department keys in order to expose one or the other of the four designations upon the shields 188, and when for instance the "charge" counter is brought into operative relation with the counter-operating-rack-bars the "Charge" designation must be exposed at the front and back of the machine, etc. To this end a pinion 190 is fast to each of the three adjoining webs or supporting arms 189 at the middle of the machine as shown in Figs. 6, 8 and 22. These pinions are operated by the special-indicator adjusting rack-bars 191 which are mounted in substantially the same manner as the rack-bars for operating the regular indicators, but are normally drawn down by coil springs 192 which connect them with the main frame. Each of these bars is formed on its rear side with rack teeth 193 which mesh respectively with the three segmental pinions 194. By reference to Fig. 8 it will be understood that the middle one of the segment-pinions is secured to a rock-shaft 250 midway between the ends of the latter, while the other two segment-pinions on opposite sides of the one just referred to, turn freely upon the shaft 250, but are respectively secured to their adjacent sleeves 195. Each of said sleeves and said shaft is provided with a series of four graduated arms 196, making twelve such arms in all, which extend respectively into the paths of roller studs 197 (Fig. 21) mounted on the links 198 which are pivoted at their lower ends to the special-indicator adjusting levers 114. The links are pivoted at their upper ends to the rearward ends respectively of the arms 199 which are journaled upon the shaft 200 (Fig. 5), from which it will be readily understood that when a department key has been pressed its special-indicator adjusting arm 114 is swung upward causing its respective roller stud 197 to strike the coöperating arm 196 sooner or later according to the degree of the graduation of the particular arm.

Fig. 21 shows an arm 196 secured upon the sleeve 195, and when said arm is swung upward by the movement of the indicator adjusting lever the segment-pinion 194 will be turned a predetermined distance according to the particular department key operated. This graduated movement is, through the rack bar 191, transmitted directly to the special indicators and operates to cause the proper indicator to be exposed through the front and rear of the case of the machine. The special indicator as well as the amount or value indicators are held in operative position until the succeeding operation of the machine, when the movement of the first-operated amount or value key moves the toggles so that when the machine is operated and the frame bar 169 moved forwardly, the indicators will be released and return to zero position.

As before described the shaft 55 carries a cam 208 which is formed with two arms 207 and 209 (Fig. 2). The latter arm is arranged to contact with the rear end of a triangular slide 233 mounted upon the main frame by a slot and pin connection, and thus force said slide forward against the tension of a spring 234 which connects it to the slide 61. Said slide carries a series of pins 235 which coact with arms 236 fast to the shafts 34 to rock the latter. This rocking movement of each shaft 34 occurs near the end of the movement of the operating handle, after the movements of the rack bars have ceased and it effects the latching of the shafts by moving the locking shoulder 33 far enough to allow the locking dogs 29 to drop into locking position. This additional movement is independent of the segment racks 36 which remain stationary, such movement being permitted by the slot-and-pin connection between the segment racks and the shafts and heretofore described as necessary to permit the independent movements of the segments when the counter-operating rack-bars are moved to effect a transfer.

It will readily be understood that a great many of the features of my machine may be changed and modified without departing from the spirit of my invention. I have already designed other machines embodying the principle of my present invention in which, however, a great many of the features and even the cycle of operation is changed. For instance, the counter instead of swinging into operative relation with the counter-operating racks just at the end of the downward movement of the restoring-frame, may not swing into such relation until the beginning of the return movement of the restoring-frame. Likewise the operated counter instead of remaining in operative engagement between successive registrations might be disconnected and returned to normal position upon the completion of each registration; and so with the various indicators. I cannot here undertake to recite all the possible changes and modifications of my invention, but a great many will be readily apparent to those skilled in the art and familiar with the varying demands of the merchants who use cash registers.

Having thus described my invention what I claim as new and desire to secure by Letters Patent is:

1. In a cash register, the combination with an operating mechanism of a series of amount keys, a series of department keys normally depressible but ineffective in connection with the operating mechanism, a special key normally effective, and means operated by the amount keys for rendering the department keys effective and the special key ineffective.

2. In a cash register, the combination with a register operating mechanism, of a series of independent counters mounted in movable frames, a grand total counter similarly mounted, and a series of keys arranged when operated to set one of the independent counters and the grand total counter for operation.

3. In a cash register, the combination with a register operating mechanism, of a series of independent counters, a totalizing counter, spring means for bringing the counters and the operating mechanism together, and a series of keys arranged when operated to put the spring means of one of the independent counters and that of the totalizing counter under tension.

4. In a cash register, the combination with a register operating mechanism, of a series of independent counters, a totalizing counter, spring devices for throwing the respective counters into coöperative relation with the operating mechanism, and a series of keys arranged when operated to put the spring devices of one of the independent counters and of the totalizing counter under tension.

5. In a cash register, the combination with a series of amount or value keys, of a counter, a series of rack-bars for operating said counter, segmental racks gearing with the rack bars, and a series of graduated registering stops coöperating with said segments and arranged to coact with the operated keys.

6. In a cash register, the combination with a spring impelled frame, of a counter, a series of counter operating rack bars, springs connecting said frame and rack bars, a key for releasing said frame and means for resetting the frame against the tension of its spring.

7. In a cash register, the combination with a counter, of a series of operating devices, the restoring frame for moving them positively in one direction and springs connecting said frame and operating devices and arranged so as to exert their tension only after the restoring frame has commenced its movement.

8. In a cash register, the combination with a counter, of a series of operating racks, a restoring frame common to said racks, movable actuating means on said frame and engaging said racks for imparting an initial movement to said frame and a spring arranged to exert its force on the frame only after the initial movement of the latter.

9. In a cash register, the combination with a counter, of operating devices for the same, a cash drawer, an operating handle, and independent means connecting the cash drawer and operating devices and the handle and operating devices so that the handle may be employed to operate the machine when it is desired to leave the drawer open.

10. In a cash register, the combination with a counter, of a series of counter-operating racks, a restoring frame common to all of said racks, spring actuated means for operating said frame when released, a latch for said frame, means for releasing said latch, a cash drawer, an operating handle, and means connecting the cash drawer and operating handle respectively with the restoring frame whereby the frame may be operated by the handle when it is desired to leave the drawer open.

11. In a cash register, the combination with a counter, of counter operating devices, a restoring frame common to said devices, a latch for holding said frame, in its normal position, means for releasing said latch, a shaft, means supported thereby for restoring the frame, a cash drawer arranged to reset said means and an operating handle arranged to reset said means when the cash drawer is left open.

12. In a cash register, the combination with a main frame, of counter, counter operating devices, a restoring frame common to said devices, a cam for operating said restoring frame journaled upon the main frame, and a cash drawer adapted to move said cam.

13. In a cash register, the combination with a counter, of counter operating devices, a restoring frame common to said devices, springs for drawing said frame down, a rock shaft carrying a cam arranged to engage and elevate said frame, a lever fast to said shaft and a cash drawer for operating said lever.

14. In a cash register, the combination with a counter, of counter-operating devices, the restoring frame common to all of said devices, springs to move said frame in one direction, springs connecting said frame and said operating devices, a cam for moving said frame against the tension of its springs, and means for moving said cam.

15. In a cash register, the combination with a counter, of counter operating racks, a restoring frame common to said racks, springs mounted on said frame and connected to said racks and arranged to be put under tension upon the movement of the frame, springs for moving said frame in one direction, and devices for moving said frame against the tension of its spring in the opposite direction.

16. In a cash register, the combination with a counter, of a series of operating devices, a series of indicators, adjusting bars connected to said indicators, a pivoted frame for locking said bars, an extension on said frame carrying a spring plunger, and a cam mounted on a rock-shaft and coacting with said plunger.

17. In a cash register, the combination with a counter, of a series of counter-operating devices, a movable member common to all of said devices, a series of indicators, levers for operating said indicators connected to the operating devices and springs normally tending to move said levers and arranged to be disengaged therefrom by the movable member.

18. In a cash register, the combination with a counter, of a series of counter operating devices, means for actuating said devices, a series of indicators, a series of operating levers for said indicators and a series of levers actuated by the operating devices and arranged to engage and elevate the indicator operating levers and leave them in their elevated positions.

19. In a cash register, the combination with a counter, of a series of counter operating racks, means for actuating said racks, a series of indicators, a series of indicator operating devices, means for operatively connecting the said racks and the indicator operating devices during one movement of said racks and for disconnecting them during the return movement of said racks to normal position, and means for connecting the racks with the counter upon their return movement.

20. In a cash register, the combination with a counter, of a series of counter operating devices, a series of indicators, a series of indicator operating levers, and a series of pivoted levers arranged to be actuated by the operating devices to move the indicator operating levers.

21. In a cash register, the combination with a series of keys, of a plurality of independent counters, a series of rack-bars for operating said counters, a frame common to all of said rack-bars for operating them, a series of indicators, and means connecting the rack-bars and indicators whereby the latter may be set by the rack-bars and so held while the rack bars return to normal position independently thereof to actuate the counters.

22. In a cash register, the combination with a series of keys, of a plurality of independent counters, a series of rack-bars for operating said counters, a pivoted frame for operating said rack-bars, a series of indicators, a series of pivoted levers connecting with the rack-bars and the indicators to move the latter different distances, a series of special keys and means connecting the special keys and counters for bringing the latter into operative connection with the racks.

23. In a cash register, the combination with a series of keys, of a series of independent counters, a series of rack-bars for operating said counters and arranged in sets, shafts carrying rack segments for connecting the respective bars of the different sets of rack-bars and a series of graduated stops on each shaft arranged to coact with the keys.

24. In a cash register, the combination with a series of keys, of a plurality of independent counters, a series of rack bars for operating said counters, shafts carrying segmental racks which gear with said bars, a plurality of graduated stops which coact with the keys and latches for said shafts arranged to be actuated by said keys.

25. In a cash register, the combination with a series of keys, of a series of shafts carrying graduated stops and operating segments, a series of racks connected to said segments, a frame common to and supporting said racks, means for operating said frame, and a series of independent counters any one of which may be brought into connection with the said racks at will.

26. In a cash register, the combination with a series of keys, of a series of segments arranged to be limited in their movements by said keys, a series of racks meshing with said segments, a series of independent counters, means for throwing said counters into connection with the racks, a movable frame for operating the racks in one direction and other means for moving them in the opposite direction.

27. In a cash register, the combination with a series of independent counters, of counter operating devices, a series of special or department keys and independent spring means set by the said special keys to throw their respective counters into connection with the operating devices upon the subsequent operation of the machine.

28. In a cash register, the combination with a counter, of operating means for said counter, spring controlled devices for bringing the counter into connection with the operating means, a special key for putting said spring controlled devices under tension and holding means for the spring devices arranged to be released to permit the engagement of counter and operating means upon the operation of the machine.

29. In a cash register, the combination with a counter, of operating means for said counter, spring devices for bringing the counter into connection with the operating means, means for putting said spring devices under tension, holding means for said spring devices, and an operating mechanism and connections arranged to release the holding means.

30. In a cash register, the combination with a counter, of counter operating devices, spring controlled means for throwing the counter into connection with said operating devices, a special key for putting said spring controlled means under tension, and locking devices connected to said spring controlled means for holding it either in its operative or inoperative position.

31. In a cash register, the combination with a counter, of counter operating devices, spring controlled means for throwing the counter into connection with said operating devices, a special key for putting said spring controlled means under tension, toggle levers connected to said counter and spring controlled means for preventing or allowing the throwing of the counter.

32. In a cash register, the combination with a series of keys, of a plurality of independent counters, a series of rack-bars for operating said counters, a series of special counter keys and spring controlled means set by the special keys for throwing the counters into connection with the rack-bars upon the operation of the machine.

33. In a cash register, the combination with a series of keys, of a plurality of independent counters, a series of rack-bars for operating said counters, a series of special keys, springs arranged to be put under tension by said special keys, counter throwing devices engaged by said springs, means for normally holding said throwing devices inactive and devices for moving said means to permit the throwing devices to operate.

34. In a cash register, the combination with a series of keys, of a plurality of independent counters, a series of rack bars for operating said counters, a series of special keys, springs arranged to be put under tension by said special keys, levers arranged to be operated by said springs, means for locking the levers in their different positions, and counter throwing devices connected to said levers.

35. In a cash register, the combination with a series of keys, of a plurality of independent counters, a series of rack-bars for operating said counters, a series of special keys, pivoted frames arranged to be operated by said keys, a series of operating levers, springs interposed between said frames and levers, and counter throwing devices connected to said levers.

36. In a cash register, the combination with a series of keys, of a series of independent counters, a series of rack bars for operating said counters, a frame common to all of said rack-bars and arranged to operate them, toggle levers connected to said frame, and a spring mounted on said levers for throwing them after they have passed dead center.

37. In a cash register, the combination with a counter, of a series of counter operating devices, a frame common to said devices, and a spring arranged to exert its force on the frame only after the initial movement of the latter.

38. In a cash register, the combination with register operating devices, of a series of independent counters each comprising a shaft carrying a series of counter wheels, retaining pawls mounted on said shafts, operating arms having slot and pin connection with the said shafts, whereby the latter may have a limited movement without moving said arms, and devices for simultaneously moving all of said arms to rock the shafts and move the pawls to inoperative positions.

39. In a cash register, the combination with a counter, of a series of operating devices, a movable member common to said devices, spring means for giving said member an initial movement, and operating devices for said member brought into action automatically by the initial movement of the member.

40. In a cash register, the combination with counter actuating devices and a common operating member therefor, of a counter, means for giving the common operating member an initial movement, and devices for operating said common member brought into action automatically by the initial movement of said member.

41. In a cash register, the combination with a counter, of a series of counter operating elements, a common operating member for said elements, a spring actuator for said common member arranged to be brought into action automatically by the initial movement of said member, and means for giving said member an initial movement.

42. In a cash register the combination with a series of keys, of a counter, rack bars for operating said counter, a frame common to said racks for operating the same, a series of spring pressed plungers mounted on said frame for operating the rack bars additional distances.

43. In a cash register the combination with a series of keys, of a plurality of independent counters, a series of rack bars for operating said counters, a movable frame common to said bars and carrying a series of spring pressed plungers for operating the same, and transfer devices operated by the counters and arranged to release the bars so that they will be moved by the said plungers.

44. In a cash register, the combination with a counter, of a series of counter operating elements, a common actuating member for said elements arranged to move the latter positively in one direction, and a flexible means connecting said member and operating elements for assisting the movements of the latter in the opposite direction.

45. In a cash register, the combination with a counter, of a series of counter operating elements, a common actuating member for said elements arranged to move the same positively in one direction, and springs connecting said member and elements for assisting the movements of the latter in the opposite direction.

46. In a cash register the combination with register operating devices, of a plurality of independent counters arranged to be brought into connection with the same, and each comprising a series of counter wheels and retaining pawls for holding the same in position, and means arranged to simultaneously throw all of said pawls out of operative position when the counters are to be turned to zero.

47. In a cash register, the combination with a counter, of a series of counter operating elements, a common actuating member for said elements, spring devices intermediate the member and elements for assisting the member in its initial movements, and an independent device for continuing the movement of the member after an initial movement has been imparted to it.

48. In a cash register the combination with operating racks, of a movable member common to all of said racks and arranged to actuate them through varying portions of its stroke, a rotary ratchet wheel, a crank pin on said wheel, a pivoted link connecting said movable member and crank pin, a pawl engaging said ratchet wheel, and a spring for forcing the crank pin past the dead centers of the link during the operation of the machine.

49. In a cash register the combination with a series of keys, of operating racks coacting therewith, a member common to said racks and arranged to actuate them through varying portions of its stroke, a ratchet wheel, a pawl engaging said wheel, a link connecting the common member and ratchet wheel, and a spring connected to said link for forcing the same past its dead center during the rotation of the wheel.

50. In a cash register, the combination with an operating mechanism, of a counter, spring means for bringing the counter and the operating mechanism together, and devices for putting the spring means under tension.

51. In a cash register the combination with a series of keys, of a series of independent counters, a series of rack bars for operating said counters, rotary devices connected with said rack bars and having provisions co-acting with said keys for producing differential movements of said bars, a movable frame common to said bars for moving them in one direction, and springs for moving said bars in the opposite direction when released.

52. In a cash register the combination with a counter, of a series of operating devices, a member common to all of said devices and carrying a series of spring pressed plungers which engage said operating devices and impart an initial movement to said member and spring devices connected to said member and arranged to exert their force only after the initial movement of the member.

53. In a cash register the combination with a series of keys, of a counter, a series of counter operating devices arranged to be limited in their movements by said keys, a movable member common to all of said operating devices for moving the same in one direction, and spring means connecting the movable member and operating devices whereby said member may move in the opposite direction and draw said bars after it or leave them in normal position.

54. In a cash register the combination with a series of keys, of a plurality of independent counters, a series of rack bars for operating said counters, a movable frame common to all of said rack bars for moving the latter in one direction and spring means connecting the bars and frame whereby the frame may move in an opposite direction and draw said bars after it or leave them in normal position.

55. In a cash register, the combination with a series of amount keys, of a counter, a series of rack bars for operating the counter, rotary devices connected to the rack bars, and means intermediate the keys and said rotary devices for limiting the rotary movements of the latter.

56. In a cash register, the combination with a series of keys, of a counter, a series of rack bars for operating the counter, rotary devices geared to said bars, and means carried by said rotary devices and coöperating with the keys to limit the movement of the rotation of said devices and thus limit the extent of movement of the rack bars.

57. In a cash register the combination with a counter, of a series of counter operating devices, a series of indicators, a common member for operating said devices, connecting mechanism for the indicators, springs for actuating said mechanism and also the operating devices, and means mounted on the common member for removing the tension of the springs from the operating devices.

58. In a cash register the combination with a counter, of a series of counter operating devices, a series of indicators, a common member for operating said devices, springs connecting said indicators to said operating devices and means mounted on the common member for removing the pressure of the springs from the operating devices when the member assumes a certain position.

59. In a cash register the combination with a counter, of a series of operating devices, a movable member common to said devices and arranged to hold them in their normal positions, means mounted on said member for giving the same an initial movement, and a normally inactive power device arranged to exert its force on the common member after the initial movement of the same.

60. In a cash register the combination with a counter, of a series of operating devices, a movable member common to said devices, spring means on said member and engaging said devices to impart an initial movement to said member, and a power device automatically brought into action to exert its force on the member after its initial movement.

61. In a cash register the combination with a counter of operating devices for the same, a cash drawer, means connecting said cash drawer and operating devices whereby the former will actuate the latter but the latter may be operated independently of the former, a handle, and means connecting said handle and operating devices for moving the latter when the cash drawer is left open.

62. In a cash register the combination with a counter, of a series of counter operating devices, a movable member controlling said devices a cash drawer, an operating handle, and devices for connecting the cash drawer and handle to the movable member whereby the handle may be used to operate said member when the drawer is left open.

63. In a cash register the combination with a counter, of operating devices for the same, a cash drawer, means connecting said drawer and operating devices whereby the movements of the drawer will operate the same but said devices may be actuated independently of said drawer, a handle for operating said devices when the cash drawer is left open and an operating spring arranged to be put under tension by the drawer and the handle.

64. In a cash register the combination with a counter, of a series of counter operating devices, a member common to all of said devices, spring devices for operating said member when released, and a cash drawer and operating handle adapted to reset the member against its spring tension.

65. In a cash register the combination with a counter, of a series of operating devices, a series of indicators, a movable frame for holding said indicators in their set positions, a spring plunger mounted on said frame and a cam connected to the movable part of the machine and coöperating with said plunger.

66. In a cash register the combination with a counter, of a series of counter operating devices, a series of indicators, a series of operating levers for said indicators, a series of levers actuated by the operating devices and arranged to elevate the indicator levers and leave them in their elevated positions, and springs connected to the indicator levers for drawing them down.

67. In a cash register the combination with a series of keys, of a series of independent counters, counter throwing devices a series of counter operating rack bars, a series of indicators, means connecting said rack bars and indicators whereby the latter may be set and so held while the rack bars return, a series of special keys for setting the independent counter throwing devices for operation and a series of special indicators connected to the counter throwing devices.

68. In a cash register the combination with a series of counters, of a series of counter operating racks, brackets mounted on said racks, a movable frame common to all of said racks and carrying spring plungers which engage said brackets, means for actuating said frame, and springs connecting said frame and rack bars and arranged to be put under tension only after the movement of the frame is commenced.

69. In a cash register the combination with a series of keys, of a series of independent counters, a series of rack bars for the respective counters arranged in sets, shafts carrying coupling segments for causing the respective corresponding bars of the several sets to move correspondingly, a frame common to all of said rack bars for operating the same, a series of special keys for said counters, and locking means for the frame arranged to be released by said special keys.

70. In a cash register the combination with a counter, of counter operating devices, a series of keys arranged in horizontal rows and formed with retaining notches, a series of pivoted shafts one for each of said rows of keys, latching arms mounted on said shafts and arranged to engage the notches on said keys, and means for simultaneously rocking all of said shafts to release the keys.

71. In a cash register the combination with a counter, of counter operating devices, a series of keys formed with retaining notches, a series of rock shafts carrying latching arms which enter said notches, springs connected to said shafts for causing them to normally force said arms against said keys and means for rotating all of said shafts upon the operation of the machine to release the operated keys.

72. In a cash register the combination with a counter, of counter operating devices, a series of keys having notched shanks, a series of shafts carrying arms which engage said shanks, a locking means for the operating devices arranged to be actuated upon the movement of any one of said shafts.

73. In a cash register the combination with a counter, of counter operating devices, a series of keys having shanks, a series of shafts carrying latches for said shanks, a slide adapted to be actuated upon the movement of any one of said shafts, a locking means for the machine and devices connecting said slide and locking means.

74. In a cash register the combination with a counter, of counter operating devices, a series of keys, a series of shafts carrying latches for said keys, a movable member common to all the operating devices, a lock for said member and means connecting the said shaft and lock.

75. In a cash register the combination with a counter, of counter operating devices, a series of keys having shanks formed with spaced notches and arranged in banks, a series of rock shafts carrying latching arms which coöperate with said shanks so that when a key is operated its shaft is rocked to release all previously operated keys in the same bank.

76. In a cash register the combination with a counter, of counter operating devices, a series of keys having notched shanks, a series of rock shafts carrying latches for said shanks, means for rocking all of said shafts simultaneously to release the keys, a lock for the machine and means arranged to be actuated by any one of said shafts for operating said lock.

77. In a cash register the combination with a registering mechanism, a series of keys, a series of rock shafts carrying latches for said keys for controlling the same, a slide for simultaneously rocking all of said shafts and means for moving said slide upon each operation of the machine.

78. In a cash register the combination with a registering mechanism, a series of keys, latches for said keys for controlling the same, a slide carrying a pivoted pawl adapted to be struck by an oscillating portion of the machine and means connecting said slide and latches.

79. In a cash register the combination with a counter, of a series of counter operating devices, a series of indicators carrying pinions, a series of rack bars for operating said pinions, and spring controlled means connecting the operating devices and rack bars whereby the latter move with the former to set the indicators and remain so set under spring tension while the operating devices return.

80. In a cash register the combination with a registering mechanism of a series of special keys, bars controlled by the special keys, a rock shaft carrying a series of graduated arms which are arranged to be operated by said bars, a special indicator and means connecting said shaft and indicator.

81. In a cash register the combination with a counter, of counter operating mechanism, a series of special keys, bars controlled by said keys, a rock shaft carrying a series of graduated arms which coöperate with said bars, rack segments mounted on said shaft, a series of special indicators, and rack bars coöperating with the segments and connected to the indicators.

82. In a cash register the combination with a counter, of a series of counter operating rack bars, stops for arresting said bars at normal positions, a rock shaft carrying pins for resetting said stops, means arranged to be operated by the counter for tripping said stops, and means connecting the rock shaft to the movable parts of the machine.

83. In a cash register the combination with a counter of a series of keys, a series of shafts, latches for said shafts, controlled by the keys, stops and operating devices mounted on said shafts, means for operating said devices to rock the shafts, and a movable frame arranged to give said shafts a final rocking movement to permit their latches to catch and retain them.

84. In a cash register the combination with a counter of a series of keys, a series of rock shafts, operating segments having lost motion connection with said shafts, counter operating devices gearing with said segments, latches for said shafts arranged to be operated by the keys, and means for moving the shafts independently of the segments to effect the catching of the latches.

85. In a cash register the combination with a counter, of counter operating mechanism, a counter throwing lever, a shaft and connections for locking said lever in its shifted positions, a slide, a key for operating the slide, and operating means intermediate said slide and rocking said shaft.

86. In a cash register the combination with an operating mechanism, of a series of counters, counter throwing levers carrying links, a rod engaging said links for moving the same to locking positions above or below the levers, a series of keys, and means for moving said rod upon the movement of said keys.

87. In a cash register the combination with an operating mechanism, of a series of counters, a series of amount keys a series of special keys, and a releasing device for the machine arranged to be set by the operation of an amount key, and means connected to the speical keys for operating said device when so set.

88. In a cash register the combination with an operating mechanism, of a series of counters, a series of amount keys, a releasing slide for the machine, operating means connected to the counter, special keys and connections for actuating said slide and devices connected to the amount keys for moving the slide into the path of the special key connections.

89. In a cash register the combination with an operating mechanism, of a series of counters, a series of amount keys, a series of special keys, a releasing slide for the machine, a slide arranged to be operated by the amount keys, for shifting the releasing slide and means operated by the special keys for operating the releasing slide when so shifted but not otherwise.

90. In a cash register the combination with an operating mechanism, of a series of counters a series of counter throwing levers, a locking shaft for said levers, a series of keys, means for operating said shaft when a key is operated, and devices for again rocking said shaft by the movement of the machine.

91. In a cash register the combination with an operating mechanism, of a latch for the same, counters, a cash drawer, a latch for said drawer, rigidly connected to the first mentioned latch, special keys and means operated by said special keys for operating said latches.

92. In a cash register the combination with an operating mechanism, of a series of counters, counter throwing levers, locking means for the same, a rock shaft for operating said locking means, a lever mounted on said shaft, a special key, a movable member operated by said keys, a movable operating device mounted on said member and adapted to engage the lever on said shaft, and a trip for disengaging said device from said lever.

93. In a cash register the combination with an operating mechanism, of a series of movable department counters, a movable grand total counter throwing levers for the respective counters, means for setting any one of the department counter levers for operation, and setting devices for the grand total counter arranged to be actuated by said first mentioned setting means.

94. In a cash register the combination with an operating mechanism, of a series of movable department counters, a movable grand totalizing counter, independent setting means for the department counters, a rock shaft arranged to be actuated by any one of said means, and setting devices for the totalizing counter adapted to be operated by said shaft.

95. In a cash register the combination with an operating mechanism, of a series of department counters, throwing levers for said counters, a series of special keys, spring devices arranged to be set to throw the levers by said keys, a totalizing counter and a throwing device for said counter arranged to be set when any one of said spring devices is set.

96. In a cash register the combination with an operating mechanism, of a series of department counters, throwing levers for said counters, a series of special keys, throwing devices including a spring and arranged to be set to throw the levers, by said keys, a totalizing counter, a lever for throwing said counter, a spring device for throwing said lever and means arranged to be operated by any one of the throwing devices of the special keys for setting the spring device of the totalizing counter.

97. In a cash register the combination with an operating mechanism, of a series of department counters, a series of levers for throwing the same, a series of special keys, a series of frames adapted to be actuated by said keys, springs between said frames and levers, and locking devices for said levers arranged to be operated by said keys.

98. In a cash register, the combination with an operating mechanism, of a counter, spring actuated devices for bringing the counter and the operating mechanism into operative relation and a special department key for putting said spring actuated devices under tension to establish said operative relation.

99. In a cash register, the combination with an operating mechanism, of a counter, spring actuated devices for establishing an operative relation between said counter and the operating mechanism and a special or department key for controlling said spring actuated devices for establishing such operative relation.

100. In a cash register, the combination with a series of operating racks, of a counter normally disengaged therefrom, spring actuated devices for moving the counter into operative engagement with the racks and a special or department key for controlling said spring actuated devices.

101. In a cash register, the combination with a series of counter operating racks, of a counter, a series of cash keys arranged to set the operating racks for a predetermined movement, a special or department key arranged to release the operating racks and to establish an operative relation between the counter and the operating means.

102. In a cash register the combination with an operating mechanism, of a counter adapted to be set into inoperative engagement therewith, a series of amount or value keys arranged to disestablish said operative relation and a series of special or department keys arranged to reëstablish said operative relation.

103. In a cash register the combination with a register operating mechanism, of a counter, special or department keys arranged to establish an operative relation between said counter and the register operating mechanism, and a series of cash or value keys arranged to subsequently disestablish such operative relation.

104. In a cash register the combination with a counter, of a series of counter operating devices, a movable member common to all of said operating devices and arranged to move them positively in one direction, and flexible means connecting said member and the operating devices substantially as described.

105. In a cash register, the combination with a counter, of the counter operating racks, a series of department keys arranged to release said racks, a restoring frame arranged to reset the racks and an operating mechanism arranged to reset the restoring frame.

106. In a cash register, the combination with a series of counter-operating racks, of a counter mounted in a movable frame and arranged to be thrown into and out of engagement with said racks, a special or department key arranged to release the racks and to establish operative engagement of the counter therewith, a restoring frame for resetting the operating racks, a cash drawer, and means controlled thereby for resetting the restoring frame.

107. In a cash register the combination with a series of counter operating racks, of a series of counters mounted in movable frames and arranged to be brought into operative engagement therewith, a series of amount or value keys for determining the movement of the racks, a restoring frame, a cash drawer, means connecting the restoring frame and the department keys whereby the operation of a department key will release the restoring frame, and means for resetting the restoring frame.

108. In a cash register, the combination with a counter mounted in a movable frame, of a series of racks, a special or department key for establishing an operative relation between said counter and said racks, a restoring frame, means for giving the racks a variable movement according to the amount to be registered, means whereby the restoring frame is released upon the operation of the department or special key, and means for resetting the restoring frame.

109. In a cash register, the combination with a series of counter operating racks, of a counter mounted in a movable frame, a special or department key arranged to release the racks and to establish perative engagement of the counter therewith, an operating mechanism for resetting the said racks.

110. In a cash register, the combination with a counter operating mechanism, of a series of independent counters, a totalizing counter, a series of special keys, means operated by a number of said special keys whereby one of the independent counters and the totalizing counter are brought into coöperative relation with the operating mechanism and means connected to the remainder of said special keys whereby only their respective counters are brought to operative position without effecting the totalizing counter.

111. In a cash register, the combination with a spring impelled frame, of a counter, a series of counter operating devices flexibly connected to said frame, a key for releasing said frame, and means for resetting the frame against its spring tension.

112. In a cash register, the combination with an accounting device, of a series of operating elements for the same, a common operating member for said elements, a spring for moving said member in one direction, an operating handle for moving the member against the tension of the spring, and a cash safe having a movable part which is also arranged to actuate the movable member against the tension of the spring.

113. In a cash register, the combination with a series of counters, and counter operating devices, of value keys for determining the movement of said devices, special keys for controlling said counters, and means for normally preventing operation of the operating devices, with connections whereby said preventing means will be released only by the actuation of a special key after a value key has been depressed.

114. In a cash register, the combination with a series of amount keys, of a series of special keys, a cash drawer, means arranged to be operated by the special keys to release the cash drawer, and devices for rendering said means inoperative in connection with the special keys until the amount keys are first operated.

115. In a cash register, normally operative value keys, normally operative special keys, an operating mechanism for the register, means for locking said mechanism, with connections whereby said locking means will be released only when an actuation of a value key is followed by a depression of a special key.

116. In a cash register, the combination with an operating mechanism, of a series of amount keys, a special key for releasing said operating mechanism, and means operated by the amount keys for preventing an operation of the special key from releasing said operating mechanism.

117. In a cash register, the combination with a counter operating mechanism, of a series of independent counters arranged to be moved into coöperative relation with the operating mechanism, a series of amount keys arranged to disestablish said operative relation between any of the counters and the operating mechanism, and independent devices adapted to reëstablish said operative relation.

118. In a cash register, the combination with a counter operating mechanism, of a counter adapted to be brought into operative engagement therewith, a series of keys arranged to disestablish the operative relation and independent devices adapted to reestablish said operative relation of the counter and the operating mechanism.

119. In a cash register, the combination with a counter operating mechanism, of a series of independent counters, independent spring actuated devices for bringing the respective counters into coöperative relation with the counter operating mechanism, and a series of special keys one for each of said counters for putting its respective spring device under tension to establish said operative relation.

120. In a cash register, the combination with a spring impelled register operating mechanism, of a series of counter operating rack bars arranged to be actuated thereby, a counter arranged to be moved into connection with said rack bars, a spring device for so moving said counter, and a key for putting said spring device under tension and releasing the registering operating mechanism.

121. In a cash register, the combination with a spring impelled register operating mechanism, of a handle for resetting said mechanism, a counter, a spring device for throwing the same arranged to be released by the operating mechanism and a key for putting the spring device under tension and releasing the operating mechanism.

122. In a cash register, the combination with a spring impelled register operating mechanism, of a counter mounted in a movable frame, a spring device for throwing the frame arranged to be released by the final movement of the initial stroke of the operating mechanism, and a key arranged to put the spring device under tension and release the register operating mechanism.

123. In a cash register, the combination with a spring impelled register operating mechanism, of a series of independent counters, a totalizing counter, spring devices for throwing the respective counters into coöperative relation with the operating mechanism, and a series of keys arranged when operated to release the operating mechanism and put the spring devices of one of the independent counters and of the totalizing counter under tension.

124. In a cash register, the combination with a spring impelled register operating mechanism, of a series of independent counters arranged to be moved into connection with the same, spring devices for so throwing said counters and a series of keys arranged when operated to release the operating mechanism and put the spring device of one of the independent counters and of the totalizing counter under tension.

125. In a cash register, the combination with an operating mechanism, of a series of amount keys, a cash drawer, a drawer latch, a series of department keys normally depressible but ineffective in connection with said latch, a special key normally effective in connection with said latch, and means operated by the amount keys for rendering the department keys effective and the special key ineffective in connection with the latch.

126. In a cash register, the combination with an operating mechanism, of a series of amount keys, a cash drawer, a series of department keys normally depressible but ineffective in connection with the drawer, a special key normally effective in connection with the drawer, and means operated by the amount keys for rendering the department keys effective and the special key ineffective.

127. In a cash register, the combination with a registering mechanism, of a cash drawer, an operating handle, and independent means connecting the cash drawer and registering mechanism and the handle and registering mechanism so that the handle may be employed to operate the machine when it is desired to leave the cash drawer out of the operation, or vice versa.

128. In a cash register, the combination with a counter, of a series of counter operating elements, an operating frame common to all of said elements, spring means actuating said frame when released, a cash drawer, an operating handle arranged to move with said frame, and means connecting the cash drawer and frame whereby the latter may be actuated by the cash drawer or by the handle as desired.

129. In a cash register, the combination with a series of keys, of a series of counter operating elements arranged to be limited in their movements by the operated keys, of a counter, a common means for returning all of said operating elements to their normal positions, a handle arranged to operate the common means, a cash drawer, and means connecting the cash drawer and the common operating means whereby the latter may be operated from either the cash drawer or the handle.

130. In a cash register, the combination with a series of counter operating elements normally held in their elevated positions, of a counter, a series of keys arranged to release said elements and to arrest their downward movements, a common frame for returning all of said elements to their normal positions, an operating handle for said 131. In a cash register, the combination with a series of counter operating elements, of a counter arranged to be brought into coöperative relation with said elements upon their upward movements, a series of keys for limiting the downward movements of said elements, an operating means for returning all of the elements to their upper positions, an operating handle connected to said mechanism, and a cash drawer also connected to said mechanism for operating the same.

132. In a cash register, the combination with a series of keys, of movable counter operating elements including graduated stops arranged to contact with the operated keys to limit the downward movements of said elements, a counter coöperating with said elements, an operating mechanism for returning all of the elements to their upper positions, a handle connected to the operating mechanism, and a cash drawer also connected to the operating mechanism for actuating the same.

133. In a cash register, the combination with an operating mechanism, of a counter, toggle levers arranged when operated to bring the counter into connection with the operating mechanism, a key, a spring put under tension by said key to throw the toggle, and means for preventing the operation of the toggle until after the operating mechanism has been moved a predetermined distance.

134. In a cash register, the combination with an operating mechanism, of a counter, toggle levers arranged to bring the counter into connection with the operating mechanism, a spring for throwing the toggle, a key for putting the spring under tension, and means dependent upon the movements of the operating mechanism and arranged to normally hold the members of the toggle out of alinement, but when actuated allowing the members to be brought into alinement and thrown by their dead center by the spring.

135. In a cash register, the combination with an operating mechanism, of a counter, and toggle levers connected to the counter for moving the same into and out of connections with the operating mechanism.

136. In a cash register, the combination with an operating mechanism, of a spring toggle arranged to assist the operation of said mechanism through a part of its movement only.

137. In a cash register, the combination with an operating mechanism, of a series of independent counters, a totalizing counter, spring devices for throwing the respective counters into coöperative relation with the operating mechanism, and a series of keys so arranged that when one of the same is operated it will put the spring devices of one of the independent counters and that of the totalizing counter under tension.

138. In a cash register, the combination with a registering mechanism, and a sliding cash drawer, of devices for operating said registering mechanism, and mechanism whereby the register operating devices may be actuated by the movement of the drawer, or whereby said registering operation may be attained independent of the drawer.

139. In a cash register, the combination with an accounting device, of an operating mechanism for the same, a cash safe having a movable part, and mechanism whereby the operating mechanism may be actuated by the movable part of the cash safe or whereby the accounting operation may be attained independent of the movement of the movable part of the cash safe.

140. In a cash register, the combination with an accounting device and a sliding cash drawer, of an operating means for said device, and mechanism whereby the operating means may be actuated by the movement of the drawer or whereby the accounting operation may be attained independent of the drawer.

141. In a cash register, the combination with an operating mechanism, and a plurality of keys all normally operative, of a lock for said operating mechanism, and means requiring the conjoint operation of all of said keys to release said lock.

142. In a cash register, the combinaiton with a driven shaft, and registering devices operated thereby, of a handle connected with said shaft for operating the same; and a separate driving mechanism having connections for also driving said shaft and said handle, said connections being such that the handle may be operated independently of the separate driving mechanism to drive said shaft to effect the registration, or by and in conjunction with said separate driving mechanism.

143. In a cash register, the combination with a counter and an operating mechanism therefor, counter throwing levers carrying links, a rod engaging said links for moving the same to locking positions above or below the levers, a series of keys, and means for moving said rod upon the movement of said keys.

144. In a cash register, the combination with an operating mechanism, a series of amount keys, a series of special keys, and a releasing device for said mechanism arranged to be set by the operation of an amount key, and means connected to the special keys for operating said device when so set.

145. In a cash register, the combination with an operating mechanism, a series of amount keys, a releasing slide for said mechanism, operating means connected to the counter, special keys and connections for actuating said slide, and devices connected to the amount keys for moving the slide into the path of the special key connections.

146. In a cash register, the combination with an operating mechanism, a series of amount keys, a series of special keys, a releasing slide for said mechanism, a slide arranged to be operated by the amount keys for shifting the releasing slide, and means operated by the special keys for operating the releasing slide when so shifted but not otherwise.

147. In a cash register, the combination with amount and special keys, of an operating mechanism, locking devices for said mechanism, means for locking said special keys when the same have been actuated, means positioned by said amount keys and operated by said special keys for releasing said locking devices, and means whereby the operation of an amount key will release the locking means for the special keys.

148. In a cash register, the combination with an operating mechanism and means normally locking the same, of a plurality of amount keys, a plurality of special keys, means for releasing said locking means when an amount and then a special key is operated, said means being inoperative to release the locking means if the special key is operated before the amount key.

149. In a cash register, the combination with sets of operating racks, of keys for limiting the movements of said racks, devices connecting all the racks of each set for operation together, the construction being such that any one rack of a set may move an additional step to effect a transfer without affecting the other racks.

150. In a cash register, the combination with sets of operating racks, of plungers, one for each rack for transmitting movement to same, a device connecting all racks of a set for operation together, and means allowing the plungers to cause an additional movement of any rack of a set without affecting the remaining racks of the set.

151. In a cash register, the combination with a main shaft and a spring for driving same in one direction, a handle for driving same in the reverse direction to tension said spring, a driving device and connecting means for actuating said handle in one direction but allowing independent movement thereof.

152. In a cash register, the combination with a plurality of banks of keys and a main operating mechanism, of a slide operated by all of said keys and serving to lock the operating mechanism during the stroke of the keys.

153. In a cash register, the combination with a plurality of banks of keys and a main operating mechanism, of a lock for said machine, means controlled by said keys for releasing said lock, a locking device for the operating mechanism normally in releasing position and means operated by said keys to move said device to locking position during the stroke of said keys.

154. In a cash register, the combination with an operating mechanism, of a series of amount keys, a series of special keys normally depressible but inoperative in connection with the operating mechanism, a "no sale" key normally operative, and means operated by the amount keys for rendering the special keys operative in connection with the operating mechanism and rendering the "no sale" key inoperative.

155. In a cash register, the combination with an operating mechanism, of a series of amount keys, a cash drawer, a drawer latch, a series of special keys normally depressible but inoperative in connection with said latch, a "no sale" key normally operative in connection with said latch, and means operated by the amount keys for rendering the special keys operative and the "no sale" key inoperative in connection with the latch.

156. In a cash register, the combination with an operating mechanism, of a series of amount keys, means for latching said keys when depressed, a cash safe, a special key for controlling said safe, latching means for same, means operated by the amount keys for rendering the special key inoperative in relation to the safe, and means for simultaneously releasing both said latching means.

157. In a cash register, the combination with an operating mechanism, of a series of amount keys, a series of special keys normally operative in connection with the operating mechanism, a "no sale" key normally operative, detent means for the amount keys and for the special and "no sale" keys, means operated by the amount keys for rendering the special keys operative and the "no sale" key inoperative in connection with the operating mechanism, and means actuated by the operating mechanism for simultaneously releasing all of said detent means.

158. In a cash register, the combination with a counter, of operating devices for the same, a cash drawer, an operating handle, and independent means connecting the cash drawer and operating devices and the handle and operating devices so that the handle may be employed to operate the machine when it is desired to leave the drawer open.

159. In a cash register, the combination with a register mechanism comprising adding wheels and devices for rotating the latter, of a lever through which the operation of the registering mechanism is attained, a sliding cash drawer and a detachable connection of said cash drawer and the adding wheels operating lever.

160. In a machine of the class described, the combination with a normally inoperative operating mechanism, of a plurality of normally operative determining devices, and means requiring an operation of the determining devices in a predetermined sequence for the purpose of rendering the operating mechanism operative.

161. In a machine of the class described, the combination with a normally inoperative operating mechanism, of a plurality of groups of normally operative keys, the keys of the different groups being effectively operable in a predetermined sequence only, and means requiring an operation of a key in each group for the purpose of rendering the operating mechanism operative.

162. In a machine of the class described, the combination with an operating mechanism of a single locking means therefor normally operative, a plurality of normally operative determining devices, and means requiring an operation of all of the determining devices for the purpose of rendering the single locking means inoperative.

163. In a machine of the class described, the combination with an operating mechanism, of a locking means therefor normally operative, a plurality of normally operative determining devices, and means requiring an operation of the determining devices in a predetermined sequence for the purpose of rendering the locking means inoperative.

164. In a machine of the class described, the combination with an operating mechanism, of a locking device therefor normally operative, a plurality of groups of normally operative keys, the keys of the different groups being effectively operable in a predetermined sequence only, and means requiring an operation of a key in each group for the purpose of rendering the locking device operative.

165. In a machine of the class described, the combination with a registering mechanism comprising a plurality of movable elements, of actuating means therefor, and independent resetting devices for said elements rendered effective by the movement of the elements, the latter being capable of movement independent of the resetting devices after said devices have been rendered effective.

166. In a machine of the class described, the combination with a registering mechanism comprising a plurality of independently movable elements, of actuating means therefor, and resetting springs for the elements rendered effective by the movement of said elements, the latter being capable of movement independent of the resetting springs after said springs have been rendered effective.

167. In a machine of the class described, the combination with a registering mechanism comprising a plurality of independently movable elements, of actuating means therefor, resetting springs for said elements, and means controlled by the element for placing the resetting springs under tension, the said means permitting continued movement of the elements while the resetting springs are under maximum tension.

168. In a machine of the class described, the combination with a registering mechanism comprising a plurality of movable elements, of actuating means therefor, pawls for retaining the registering elements in their actuated positions, resetting springs for said elements, means controlled by the elements for placing the resetting springs under tension, the said means permitting continued movement of the elements while the resetting springs are under maximum tension, and means for withdrawing the pawls from the registering elements for the purpose of permitting the resetting of the elements by the springs.

169. In a machine of the class described, the combination with a registering mechanism comprising a plurality of movable elements, of actuating means therefor, pawls for retaining the registering elements in their actuated positions, resetting springs for said elements, means controlled by the elements for placing the resetting springs under tension, the said means permitting continued movement of the elements while the resetting springs are under maximum tension, means for withdrawing the pawls from the registering elements for the purpose of permitting the resetting to zero of the registering elements by the springs, and means for arresting said elements at zero.

170. In a machine of the class described, the combination with a plurality of registering wheels, of actuators therefor, retaining pawls for said wheels, a shaft supporting said pawls, springs for resetting the wheels to zero, means controlled by the wheels for tensioning the springs, the said means permitting continued movement of the wheels while the springs are under maximum tension, and means for rocking the shaft and withdrawing the pawls from the registering wheels for the purpose of permitting the resetting of said wheels to zero by the springs.

171. In a machine of the class described, the combination with a plurality of registering wheels, of actuators therefor, retaining pawls for said wheels, a shaft supporting said pawls, springs for resetting the wheels to zero, means controlled by the wheels for tensioning the springs, the said means permitting continued movement of the wheels while the springs are under maximum tension, means for rocking the shaft and withdrawing the pawls from the registering wheels for the purpose of permitting the resetting of said wheels to zero by the springs, and devices for arresting the wheels at zero positioned under the control of the means rocking said shaft.

172. In a keyboard mechanism for the purpose described, a group of normally depressible and effective keys, a group of normally depressible but ineffective keys, and means under control of the keys of the first group for rendering the keys of the other group effective when depressed.

173. In a keyboard mechanism for the purpose described, normally depressible and effective value keys representing different denominations, normally depressible but ineffective department keys, and means under control of the value keys for rendering the department keys effective when a value key is depressed.

174. A keyboard mechanism for the purpose described, comprising normally effective value keys and ineffective department keys, and means under the control of the value keys for rendering the department keys effective when a value key is operated.

175. A keyboard mechanism for the purpose described, comprising groups of value keys representing different denominations, normally depressible but ineffective department keys, and means requiring the depression of a value key before a department key is effective when depressed.

176. A keyboard mechanism for the purpose described, comprising keys arranged in groups of different classes, the keys of certain of said classes being normally depressible but ineffective, and devices controlled by the operation of the keys in one class for rendering the keys of the adjacent class effective when operated.

177. In a keyboard mechanism, a series of value keys, a series of department keys, and locking means to prevent the effectual operation of a department key until a value key has been depressed.

178. In a cash register, a value setting element, a transaction setting element, and interlocking means between said elements for preventing their effectual operation in other than a predetermined order.

179. In a cash register, setting elements of different classes and means intermediate said setting elements for preventing their effectual operation in other than a predetermined order.

180. A keyboard for the purpose described, comprising normally operable and effective value keys and normally operable but ineffective department keys, and means under the control of the value keys rendering the department keys effective when a value key is operated.

181. In a keyboard mechanism a series of normally operable value keys, a series of normally operable but ineffective department keys, and means for rendering said department keys ineffective when operated until a value key has been operated.

182. In a cash register, a normally operable and effective value setting element, a normally operable but ineffective transaction setting element, and means for compelling the operation of said elements in a predetermined order to render the transaction setting element effective when operated.

183. In a cash register, setting elements of different classes, certain of said elements being normally operable and effective, the others being normally operable but ineffective and means intermediate said setting elements for preventing their effectual operation in other than a predetermined order.

184. In a cash register, series of keys of different classes, certain of said series being normally operable and effective, the others being normally operable but ineffective, and means intermediate said series for compelling the operation of the keys in a predetermined order to render all of said series effective when operated.

185. In a cash register, the combination of a plurality of groups of keys of different classes, the keys of the different classes being effectively depressible in a predetermined sequence only, and means for preventing an operation of the register until a key in each class has been depressed.

In testimony whereof I affix my signature, in the presence of two witnesses.

JOHN H. McCORMICK.

Witnesses:
ALVAN MACAULEY,
ROBERT M. LEE.